United States Patent
Nakahama et al.

(10) Patent No.: US 7,906,560 B2
(45) Date of Patent: Mar. 15, 2011

(54) VULCANIZED RUBBER MOLDED PRODUCT, METHOD OF PRODUCING THE SAME, AND USE OF THE MOLDED PRODUCT

(75) Inventors: Hidenari Nakahama, Ichihara (JP); Mikio Hosoya, Ichihara (JP); Masaaki Kawasaki, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 781 days.

(21) Appl. No.: 11/889,305

(22) Filed: Aug. 10, 2007

(65) Prior Publication Data

US 2008/0015270 A1 Jan. 17, 2008

Related U.S. Application Data

(62) Division of application No. 10/939,456, filed on Sep. 14, 2004, now abandoned.

(30) Foreign Application Priority Data

Oct. 10, 2003 (JP) ................................. 2003-352472

(51) Int. Cl.
C08F 8/00 (2006.01)
C08F 8/34 (2006.01)
C08J 9/36 (2006.01)

(52) U.S. Cl. ............... 521/53; 521/78; 521/89; 521/142; 525/331.9; 264/345; 264/347

(58) Field of Classification Search .................. 264/345, 264/347; 521/53, 78, 89, 142; 525/331.9
See application file for complete search history.

(56) References Cited

FOREIGN PATENT DOCUMENTS

| | | |
|---|---|---|
| DE | 644310 A | 4/1937 |
| JP | 04-113815 A | 4/1992 |
| JP | 04-202237 A | 7/1992 |
| JP | 2001-213973 | 8/2001 |
| JP | 2002-326236 A | 11/2002 |
| JP | 2002-327085 A | 11/2002 |
| RU | 2 202 566 C2 | 8/2002 |

*Primary Examiner* — Irina S Zemel
(74) *Attorney, Agent, or Firm* — Buchanan Ingersoll & Rooney PC

(57) ABSTRACT

The present invention provides a vulcanized foamed rubber molded product which has surface smoothness equal to or higher than that of a non-foamed vulcanized rubber molded product, has excellent mechanical strength properties, compression set resistance and abrasion resistance and a non-foamed vulcanized rubber molded product which is superior in surface smoothness to a conventional non-foamed vulcanized rubber molded product and has excellent compression set resistance, mechanical strength properties and abrasion resistance, as well as a method of producing the same. The molded product of the present invention is characterized in that the amount of sulfur atoms present in the surface thereof is at least 1.2 times as high as the amount of sulfur atoms present in a cut face obtained by cutting the surface to a depth of 1.0 mm in the vertical direction. The method of producing comprises allowing droplets or spray of a liquid containing an elementary substance consisting of a non-oxygen element in the group VI in the periodic table to adhere to the surface of a non-vulcanized rubber composition containing an elemental sulfur and/or a sulfur compound as a crosslinking agent, and then vulcanizing or vulcanizing and foaming the composition.

13 Claims, 4 Drawing Sheets

VULCANIZED RUBBER MOLDED PRODUCT, METHOD OF PRODUCING THE SAME, AND USE OF THE MOLDED PRODUCT

CROSS REFERENCE TO RELATED APPLICATION

This application is a Divisional Application of application Ser. No. 10/939,456, filed Sep. 14, 2004, now abandoned the disclosure of which is incorporated by reference in its entirety.

BACKGROUND OF THE INVENTION

1. Field of the Invention

The present invention relates to a vulcanized rubber molded product obtained by sulfur crosslinkage (vulcanization) and a method of producing the same and in particular to a vulcanized rubber molded product that is a foamed product obtained by continuously crosslinking (vulcanization)/foaming a rubber composition containing ethylene/α-olefin/non-conjugated polyene copolymer rubber etc. by a vulcanizing device such as a heated air vulcanizing bath (HAV), an ultra-high frequency vulcanizing device (UHF) etc., which is excellent in design, excellent in properties such as mechanical strength properties (tensile strength at break, tensile elongation at break), compression set resistance, abrasion resistance etc., and suitable for applications to automobile weather strips, glass run channels, opening trims, hoses etc., and a method of producing the same.

2. Description of the Related Art

Ethylene/α-olefin/non-conjugated polyene copolymer rubber such as ethylene/propylene/diene copolymer (EPDM) etc. is generally excellent in weatherability, heat resistance and ozone resistance, and is used for example in applications to automobiles, specifically vulcanized rubber products such as glass run channel products, window frame products or hose products.

The glass run channel products and window frame products are used for the purpose of protection against rain, wind and sound, and are important sealing parts. For increasing the duration of automobiles and for making maintenance free, there is a need for further improvements in sealing performance and long-term duration of the sealing performance. In respect of the hose products, there is a need for further improvements in heat resistance and sealing performance.

These properties are required as functions of the products, but the design of the vulcanized rubber products is also important. In the present specification, the "design" of the vulcanized rubber products refers to design depending on the surface smoothness, shape retention stability etc. of mainly the vulcanized rubber molded products (foamed products, non-foamed products).

The weather strip products are seen upon getting into or getting off an automobile, and thus their design exerts a significant influence on the image of the automobile itself.

When the vulcanized rubber product is a foamed product, its design is related closely to the state of foamed cells. When the foamed cells push up the surface of the vulcanized rubber product, the surface of the product becomes uneven to deteriorate its design. On the other hand, a vulcanized rubber product having the cells in broken state is not preferable because water permeates through the surface to deteriorate the functions thereof as a sealing product.

As a method of solving these problems, a method which involves surface treatment of a vulcanizable molded product (non-vulcanized rubber) consisting of ethylene/α-olefin copolymer rubber by coating the surface of the molded product with a treatment liquid containing a xanthogenate for accelerating vulcanization reaction and then vulcanizing the non-vulcanized rubber to give a vulcanized rubber molded product (non-foamed product) and a method which involves surface treatment of a vulcanizable, foaming molded product (non-vulcanized, non-foamed rubber) consisting of ethylene/α-olefin copolymer rubber by coating the surface of the molded product with the above treatment liquid and then vulcanizing and foaming the non-vulcanized, non-foamed rubber to give a vulcanized rubber molded product (foamed product) are disclosed in JP-A No. 4-202237 (page 2, upper right column to page 3, upper left column, and page 7, upper right column)

The vulcanized rubber molded product obtained by this conventional surface treatment method is excellent in design, but the chemical odor of the xanthogenate is strong, and it is troublesome to remove the chemical odor. As the method of coating the surface of the non-vulcanized rubber with the above treatment liquid, a dipping method using a coating bath is presented, but in this method where the non-vulcanized rubber is passed through the coating bath, the rubber surface is marred or the rubber molded product is deformed, and the rubber molded product in such state is converted into a vulcanized rubber product, which may result in deterioration of the design of the product. When the non-vulcanized rubber is molded at a lower molding speed, the rubber moves in a zigzag direction in a vulcanizing bath and entangled or bent in the chamber, which may result in problems such as failure to give an excellent vulcanized rubber product.

When the automobile weather strip product is divided roughly depending on the site where it is used, the weather strip has 3 constitutions, that is, one layer consisting of sponge rubber, two layers of sponge rubber/solid rubber, and three layers of sponge rubber/solid rubber/metal. The "sponge" refers to a foamed product, while the "solid" means a non-foamed product. The foamed product includes a product called slightly foamed solid.

The sponge rubber and solid rubber in these constitutions are different from each other in respect of performance required thereof, and are thus generally often different from each other in respect of the composition of starting materials. Accordingly, the sponge rubber and solid rubber show a different rate of crosslinkage at the molding temperature used, and thus one rubber tends to be excessively crosslinked while the other rubber tends to be poorly crosslinked. As a result, the product consisting of the 2 or 3 layers described above can be poor in interfacial adhesion between the sponge rubber and solid rubber, to easily cause defects such as interfacial separation.

For the sponge rubber in such a state as to give a sponge product by vulcanization reaction accompanied by foaming reaction, the time in which the maximum vulcanization reaction is generally reached is almost identical with the time in which the maximum foaming reaction is reached. When this balance is lost or the vulcanization reaction proceeds at a relatively higher rate than the foaming reaction, the surface smoothness of the sponge rubber product is improved and the design of the product is improved. However, such materials may scorch during molding to fail to give a product and are thus not practical.

Conventionally, when vulcanized rubber products having extremely excellent surface smoothness are to be obtained, many problems described above occur, and thus vulcanized rubber molded products (e.g. extruded sponge rubber, extruded solid rubber) having excellent surface smoothness have not been obtained.

Excellent mechanical strength properties and abrasion resistance are required of weather strip products and hose products. The weather strip products are desired to be resistant to abrasion with an automobile door and glass and resistant to abrasion with clothes in getting into or getting off an automobile. The hose products are required to be abrasion-resistant in order to prevent damage caused by abrasion among the hoses or between the hose and other products. It is known that resistance to such abrasion, or abrasion resistance, can be improved by increasing the density of crosslinkage by blending larger amounts of a crosslinking agent (vulcanizing agent), a vulcanizing accelerator and a crosslinking assistant. However, the tensile elongation and tensile strength have the optimum value respectively, and when tensile elongation is determined to be increased by the composition of starting materials, tensile strength is decreased, while when tensile strength is determined to be higher, tensile elongation is decreased. Accordingly, the design of rubber compositions achieving both tensile elongation and tensile strength is extremely difficult.

Under such circumstances, there is a need for a vulcanized rubber molded product which is a foamed product (sponge), has surface smoothness equal to or higher than that of a non-foamed product (solid) as a vulcanized rubber molded product, has excellent mechanical strength properties (tensile strength at break, tensile elongation at break etc.), and has compression set resistance and abrasion resistance as well as a method of producing the same, and there is also need for a vulcanized rubber molded product which is a non-foamed product (solid), is superior in surface smoothness to a conventional non-foamed vulcanized rubber molded product and has excellent compression set resistance, mechanical strength properties (tensile strength at break, tensile elongation at break etc.) and abrasion resistance as well as a method of producing the same.

SUMMARY OF THE INVENTION

The present invention is to solve the problems in the above prior art, and the object of the present invention is to provide a vulcanized rubber molded product which is a foamed product (sponge), has surface smoothness equal to or higher than that of a non-foamed product as a vulcanized rubber molded product, has excellent mechanical strength properties (tensile strength at break, tensile elongation at break etc.), and has compression set resistance and abrasion resistance and a method of producing the same, as well as a vulcanized rubber molded product which is a non-foamed product (solid), is superior in surface smoothness to a conventional non-foamed vulcanized rubber molded product and has excellent compression set resistance, mechanical strength properties (tensile strength at break, tensile elongation at break etc.) and abrasion resistance and a method of producing the same.

The vulcanized rubber molded product according to the present invention is characterized in that the amount of sulfur atoms present in the surface of the vulcanized rubber molded product is at least 1.2 times as high as the amount of sulfur atoms present in a cut face obtained by cutting the surface to a depth of 1.0 mm in the vertical direction.

The vulcanized rubber molded product may be a foamed product or a non-foamed product.

In the vulcanized rubber molded product according to the present invention, it is preferable that the vulcanized rubber molded product has a hollow part at least partially, and meets the following relationship:

$$A/B<1.0$$

wherein A is the surface roughness (RzD) of the vulcanized rubber molded product, and B is the roughness (RzD) of the internal surface of the hollow.

The method of producing a vulcanized rubber molded product according to the present invention comprises allowing droplets or spray of a liquid containing an elementary substance consisting of a non-oxygen element in the group VI in the periodic table to adhere to the surface of a non-vulcanized rubber composition containing an elemental sulfur and/or a sulfur compound as a crosslinking agent, and then vulcanizing or vulcanizing and foaming the composition.

In the method of producing a vulcanized rubber molded product according to the present invention, the non-vulcanized rubber composition is shaped into a predetermined product shape, and then the droplets or spray can be allowed to adhere to the surface of the composition.

Preferably, the rubber contained in the non-vulcanized rubber composition is an ethylene/α-olefin/non-conjugated polyene copolymer.

In one embodiment of the method of producing a vulcanized rubber molded product according to the present invention, when a non-vulcanized rubber composition containing, for example, an elemental sulfur and/or a sulfur compound (so-called a vulcanizing agent) as a crosslinking agent and ethylene/α-olefin/non-conjugated polyene copolymer rubber as a rubber is extruded and shaped in a predetermine product shape via an extruder and continuously crosslinked or crosslinked and foamed, the surface of the non-vulcanized rubber composition having a predetermined product shape, while being discharged from the extruder and reaching a vulcanizing bath, is allowed to have droplets or spray of a liquid containing an elementary substance consisting of a non-oxygen element in the group VI in the periodic table.

In the present invention, the liquid is preferably sprayed to generate droplets or spray and allowed to adhere to the surface of the non-vulcanized rubber composition.

The liquid is preferably a dispersion of an elementary substance consisting of a non-oxygen element in the group VI in the periodic table.

The vulcanized rubber molded product of the present invention or the vulcanized rubber molded product obtained by the method of producing of the present invention is preferably extruded sponge rubber or extruded solid rubber.

The vulcanized rubber molded product of the present invention or the vulcanized rubber molded product obtained by the method of producing of the present invention is used preferably in any application selected from the group consisting of a weather strip, a glass run channel, an opening trim and a hose.

The vulcanized rubber molded product according to the present invention is a foamed product (sponge) or a non-foamed product (solid) wherein the amount of sulfur atoms present in the surface thereof is at least 1.2 times as high as the amount of sulfur atoms present in a cut face obtained by cutting the surface to a depth of 1.0 mm in the vertical direction, and thus the foamed product in the vulcanized rubber molded products of the present invention has surface smoothness equal to or higher than that of a non-foamed product as a vulcanized rubber molded product, has excellent mechanical strength properties (tensile strength at break, tensile elongation at break etc.), and has compression set resistance and abrasion resistance. In the vulcanized rubber molded products of the present invention, the non-foamed product is superior in surface smoothness to a conventional non-foamed vulcanized rubber molded product and has excellent compression set resistance, mechanical strength properties (tensile strength at break, tensile elongation at break etc.) and abrasion resistance.

According to the method of producing the vulcanized rubber molded product in the present invention, droplets or spray of a liquid containing an elementary substance consisting of a non-oxygen element in the group VI in the periodic table are allowed to adhere to the surface of a non-vulcanized rubber composition containing an elemental sulfur and/or a sulfur compound as a crosslinking agent, followed by vulcanizing or vulcanizing and foaming the composition, and thus the vulcanized rubber molded product (foamed product, non-foamed product) of the invention having the above effects can be obtained.

By the surface treatment method of spraying the above liquid onto the surface of the non-vulcanized (non-foamed) rubber composition before vulcanization of sulfur and/or sulfur compound according to the present invention, the design of the resulting rubber product can be significantly improved, and particularly the foamed product can achieve excellent design which has hardly been achieved in the prior art and simultaneously achieve excellent compression set resistance and shape retention with improvements of foaming efficiency, and is also excellent in mechanical strength (tensile strength at break) and tensile elongation at break. The solid product is also excellent in compression set resistance, shape retention, mechanical strength (tensile strength at break), and tensile elongation at break.

DETAILED DESCRIPTION OF THE INVENTION

Figure 1:
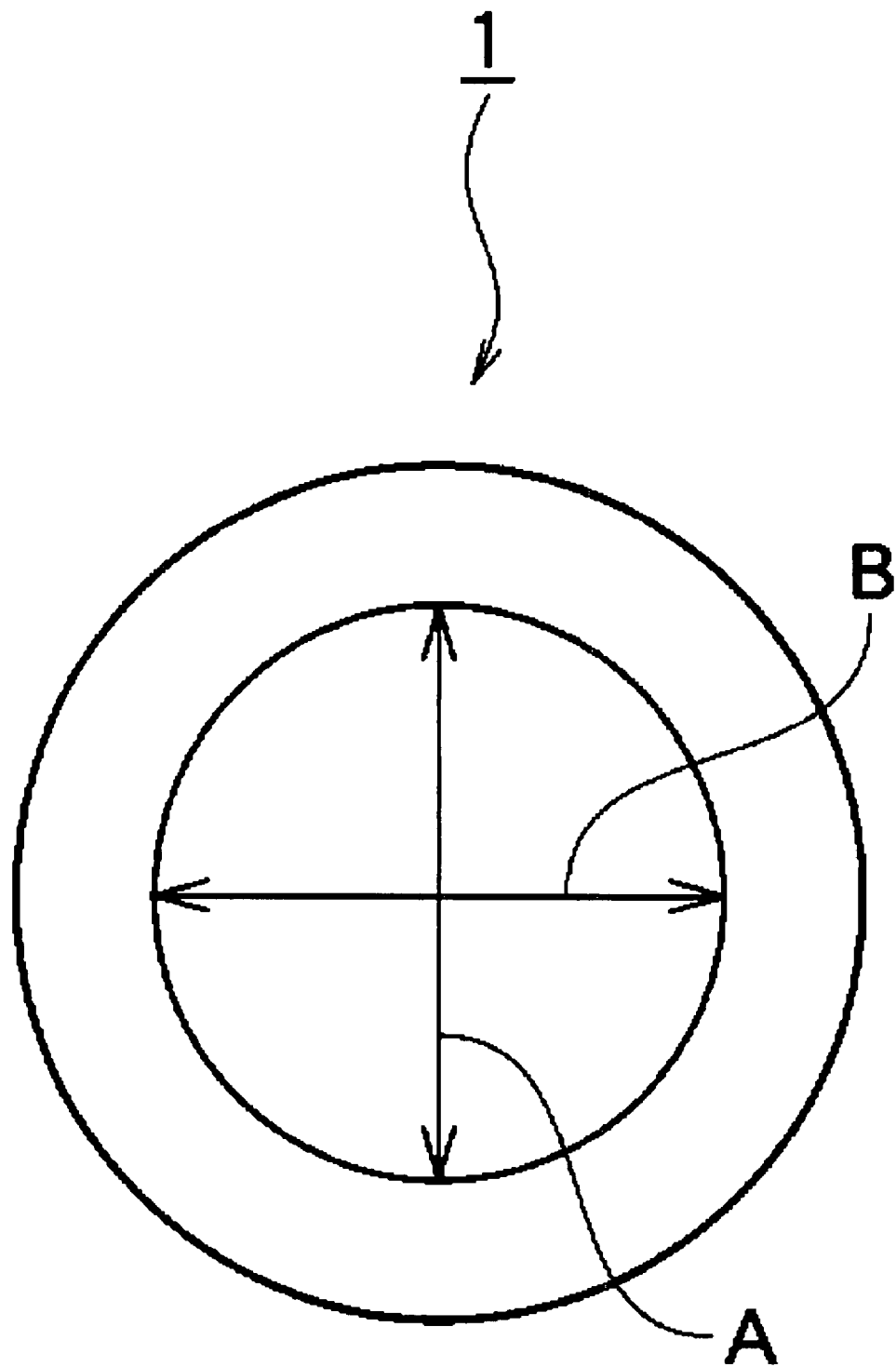
FIG. 1 is a schematic plan of a tubular sponge rubber for explaining a method of measuring shape retention.

Hereinafter, the vulcanized rubber molded product according to the present invention and the method of producing the same are described in more detail.

As described above, the vulcanized rubber molded product of the present invention is a foamed product (sponge) or a non-foamed product (solid) wherein the amount of sulfur atoms present in the surface thereof is at least 1.2 times, usually 1.2 to 10 times, preferably 1.2 to 5 times, more preferably 1.8 to 3 times, as high as the amount of sulfur atoms present in a cut face obtained by cutting the surface to a depth of 1.0 mm in the vertical direction. The vulcanized rubber molded product according to the present invention can attain the above ratio of present sulfur atoms, for example by using a single rubber composition as described above without using a product consisting of two or more molded products laminated therein. This means that the vulcanized rubber molded product of the present invention has a structure of higher density of crosslinkage in the surface than in the inside. When the amount of sulfur atoms present in the surface of the vulcanized rubber molded product is at least 1.2 times as high as the amount of sulfur atoms present in the cut face, excellent design, excellent mechanical strength properties (tensile strength at break, tensile elongation at break) and abrasion resistance can be simultaneously achieved. The amount of sulfur atoms is more preferably up to 10 times in order to prevent sulfur from being precipitated in the surface of the molded product. The vulcanized rubber molded product wherein the amount of sulfur atoms present in the surface of the molded product is regulated in the above range improves mechanical strength properties, abrasion resistance, and compression set resistance. As a matter of fact, there is no particular limitation with respect to attachment of the molded product of the present invention to another molded product.

The method of quantifying the amount of sulfur atoms will be described in the Examples. For preparation of a cut face by cutting the surface of the molded product to a depth of 1.0 mm to measure the amount of sulfur atoms present in the cut face, the surface of the molded product may be cut to a depth of 1.0 mm in the direction of vertical depth from the surface. Specifically, a cut face having a size of 1 $cm^2$ or more (for example at least 10 mm×at least 10 mm) is formed by cutting to a depth of 1.0 mm from the surface in the vertical direction. The depth of the cut face may be 1.0 mm or more in practice, for example 1.0 mm or more, and is specifically allowable up to about 1.3 mm. It is however preferable that the cut face does not penetrate from the surface via the molded product to the other side. When not only the surface including the cut face penetrating the molded product but also the other side is treated with the specific liquid by the method of the present invention, the concentration of sulfur shall be measured in a position excluding a region of higher sulfur concentration in the vicinity of the other side.

In this case, the cut face may be formed such that the minimum distance between the cut face and the other side is 0.5 mm or more.

Even if the cut face is not surfaced, measurement is not particularly influenced.

Figure 3:
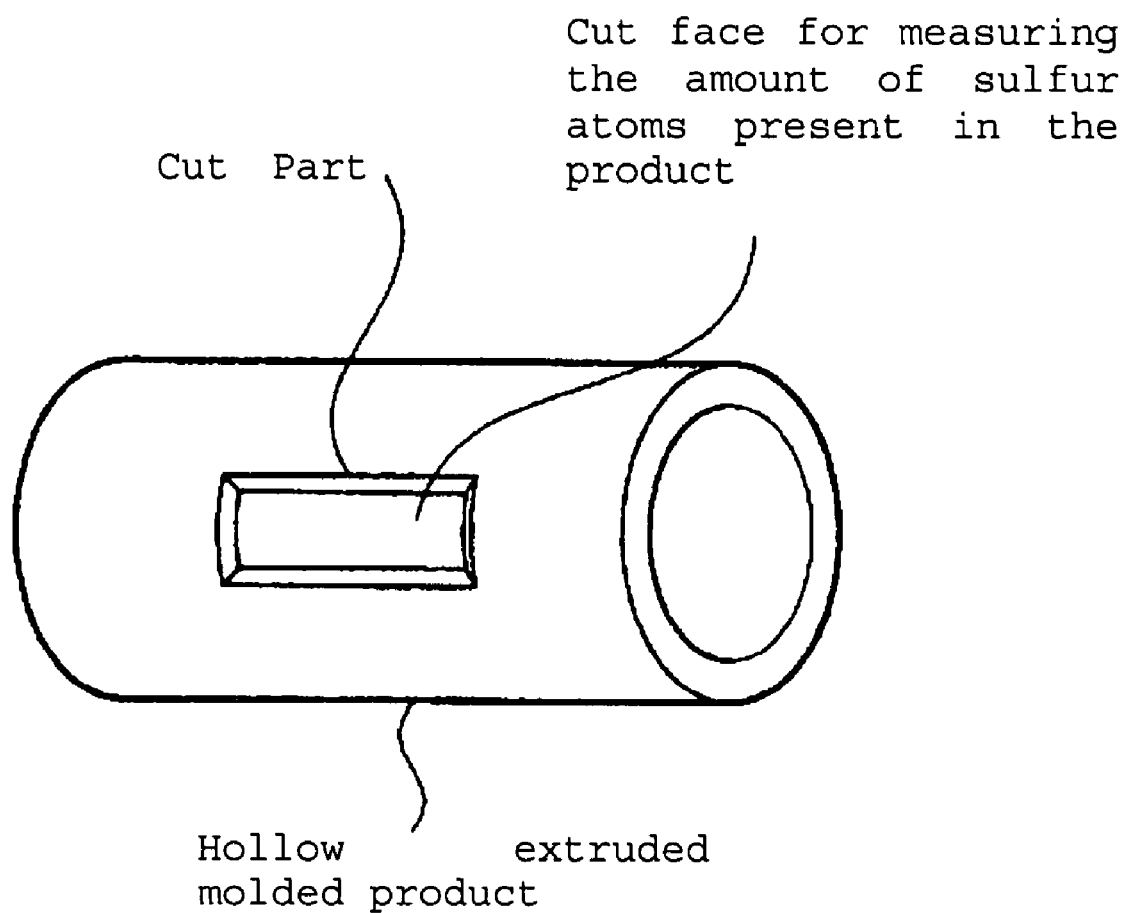
FIG. 3 is a schematic view showing one example of a cut face for measuring the amount of sulfur atoms present in a cut face obtained by cutting the surface of a molded product to a depth of 1.0 mm.

FIG. 3 shows a cut face for measuring the amount of sulfur atoms present in the inside of a molded product such as a hollow extrusion molded product.

The sulfur content in the surface of the molded product is measured, and then a surface layer of 1.0 mm in thickness from the surface of the molded product is uniformly cut and then the sulfur content in the new surface may be measured. When the side opposite to the surface via the molded product is also treated with the specific liquid by the method of the present invention, the portion to be measured shall have a thickness of 0.5 mm or more from the surface of the opposite side.

The vulcanized rubber molded product of the present invention described above makes use of a rubber composition containing a elemental sulfur and/or a sulfur compound as a crosslinking agent (a non-vulcanized rubber composition or a non-vulcanized non-foamed rubber composition), as well as a liquid containing an elementary substance consisting of a non-oxygen element in the group VI in the periodic table (hereinafter, also referred to as the "treatment liquid") in producing. As described later, the vulcanized rubber molded product can be produced by allowing droplets or spray of the liquid to adhere to the surface of the vulcanized rubber composition and then vulcanizing or vulcanizing and foaming the composition.

Rubber Composition

The rubber composition used in the present invention contains at least rubber and a crosslinking agent (vulcanizing agent).

Rubber

The rubber used in the present invention includes, for example, conventionally known ethylene/α-olefin copolymer rubber and ethylene/α-olefin/non-conjugated polyene copolymer rubber. The ethylene/α-olefin copolymer rubber includes, for example, an ethylene/propylene random copolymer (EPR) etc. The ethylene/α-olefin/non-conjugated polyene copolymer rubber includes, for example, ethylene/propylene/diene copolymer rubber (EPDM) etc.

The rubber used in the present invention can be used by blending known other rubber with the ethylene/α-olefin copolymer rubber and/or ethylene/α-olefin/non-conjugated polyene copolymer rubber in such a range that the object of the present invention is not hindered. The other rubber includes, for example, isoprene-based rubber such as natural rubber (NR) and isoprene rubber (IR), conjugated diene-based rubber such as butadiene rubber (BR), styrene/butadiene rubber (SBR), acrylonitrile/butadiene rubber (NBR) and chloroprene rubber (CR), and butyl rubber (IIR).

In particular, the ethylene/α-olefin/non-conjugated polyene copolymer rubber is preferable. This copolymer rubber may be blended with the ethylene/α-olefin copolymer rubber and/or various kinds of the above diene-based rubber.

The ethylene/α-olefin/non-conjugated polyene copolymer rubber used in the present invention is preferably ethylene/α-olefin/non-conjugated polyene copolymer rubber having the following properties (i) to (iii) [referred to hereinafter as "ethylene/α-olefin/non-conjugated polyene copolymer rubber (A)"] obtained by random copolymerization of ethylene, C3 to C20 α-olefin and non-conjugated polyene.

(i) Molar Ratio of Ethylene to C3 to C20 α-olefin (ethylene/α-olefin)

The molar ratio of (a) a unit derived from ethylene to (b) a unit derived from C3 to C20 α-olefin (hereinafter referred to sometimes as "α-olefin"), constituting the ethylene/α-olefin/non-conjugated polyene copolymer rubber (A) (ethylene/α-olefin), is usually 60/40 to 90/10, preferably 65/35 to 90/10. When this molar ratio is in this range, a vulcanized rubber molded product excellent not only in heat resistant aging, strength properties and rubber elasticity but also in cold resistance and processability can be obtained.

(ii) Iodine Value

The iodine value serving as an indicator of the content of a unit derived from non-conjugated polyene constituting the ethylene/α-olefin/non-conjugated polyene copolymer rubber (A) is usually 0.1 to 80 (g/100 g), preferably 5 to 50 (g/100 g) When this iodine value is in this range, a rubber composition of high crosslinking efficiency is obtained, and an extrusion-molded vulcanized rubber molded product excellent in compression set resistance can be obtained.

(iii) Intrinsic Viscosity

The intrinsic viscosity [η] of the ethylene/α-olefin/non-conjugated polyene copolymer rubber (A) measured in decalin at 135° C. is usually 0.5 to 5.0 dl/g, preferably 1.0 to 4.5 dl/g. When the intrinsic viscosity [η] is in this range, a vulcanized rubber molded product excellent not only in strength properties and compression set resistance but also in processability can be obtained.

Specifically, the C3 to C20 α-olefin constituting the ethylene/α-olefin/non-conjugated polyene copolymer rubber (A) includes propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decene, 11-methyl-1-dodecene, 12-ethyl-1-tetradecene etc. These α-olefins may be used alone or as a mixture of two or more thereof. Among these α-olefins, C3 to C8 α-olefins such as propylene, 1-butene, 4-methyl-1-pentene, 1-hexene and 1-octene are particularly preferable.

As the non-conjugated polyene constituting the ethylene/α-olefin/non-conjugated polyene copolymer rubber (A), cyclic or linear non-conjugated polyene can also be used.

The cyclic non-conjugated polyene includes, for example, dienes such as methyltetrahydroindene, 5-ethylidene-2-norbornene, 5-methylene-2-norbornene, 5-isopropylidene-2-norbornene, 5-vinyl-2-norbornene, 6-chloromethyl-5-isopropenyl-2-norbornene, dicyclopentadiene and norbornadiene, and trienes such as 2,3-diisopropylidene-5-norbornene, 2-ethylidene-3-isopropylidene-5-norbornene and 2-propenyl-2,5-norbornadiene.

The linear non-conjugated polyene includes, for example, dienes such as 1,4-hexadiene and 7-methyl-1,6-octadiene and trienes such as 4-ethylidene-7-methyl-1,6-nonadiene and 7-methyl-1,4,8-decatriene.

These non-conjugated polyenes can be used alone or as a mixture of two or more thereof.

In the present invention, ethylene/α-olefin/non-conjugated polyene copolymer rubber other than the ethylene/α-olefin/non-conjugated polyene copolymer rubber (A) can also be used.

Crosslinking Agent

The crosslinking agent used in the present invention is also referred to as a vulcanizing agent, and examples include an elemental sulfur, a sulfur compound, and a combination of an elemental sulfur and a sulfur compound.

In the case of the elemental sulfur, the form of sulfur is not particularly limited, and for example powder sulfur, precipitated sulfur, colloidal sulfur, surface-treated sulfur, insoluble sulfur etc. can be used.

Specific examples of the sulfur compound include sulfur chloride, sulfur dichloride, high-molecular polysulfide, morpholine disulfide, alkyl phenol disulfide, tetramethyl thiuram disulfide, and selenium dimethyldithiocarbamate.

These vulcanizing agents are used in an amount of 0.01 to 10 parts by weight, preferably 0.1 to 5 parts by weight, relative to 100 parts by weight of rubber. When the vulcanizing agent is used in the above ratio, a practically usable rubber composition for vulcanized rubber molded products excellent in tensile strength, elongation and sealing properties is obtained. In a preferable embodiment, an organic peroxide is substantially not contained therein.

Other Components

Depending on the intended applications of vulcanized products, conventionally known additives such as polyolefin resin, rubber reinforcing agents, inorganic fillers, softening agents, aging inhibitors, processing assistants, vulcanizing accelerators, foaming agents, foaming assistants, coloring agents, dispersants and flame-retardants can be blended with the rubber composition used in the present invention in such a range that the object of the present invention is not hindered.

The rubber reinforcing agents have an effect of increasing the mechanical properties of vulcanized rubber, such as tensile strength, tear strength and abrasion resistance.

Specific examples of such rubber reinforcing agents include carbon black (for example, SRF, GPF, FEF, MAF, HAF, ISAF, SAF, FT, MT), silica, activated calcium carbonate, fine talc powder, fine silicic acid powder, and silicates. These may have been subjected to surface treatment with a silane coupling agent etc.

Examples of silica include smoke silica, precipitated silica etc. The silica may be surface-treated with reactive silane such as mercaptosilane, aminosilane, hexamethyl disilazane, chlorosilane and alkoxysilane or with low-molecular siloxane.

The type and amount of these rubber reinforcing agents can be selected suitably depending on the intended applications, but usually the amount of the rubber reinforcing agents blended is up to 300 parts by weight, preferably up to 200 parts by weight, relative to 100 parts by weight of the rubber component.

The inorganic filers are specifically light calcium carbonate, heavy calcium carbonate, talc, clay etc.

The type and amount of these inorganic fillers can be selected suitably depending on the intended applications, but usually the amount of the inorganic fillers blended is up to 300 parts by weight, preferably up to 200 parts by weight, relative to 100 parts by weight of the rubber component.

As the softening agent, a softening agent used usually in rubber can be used. Specific examples include petroleum-based softening agents such as process oil, lubricating oil, paraffin oil, liquid paraffin, petroleum asphalt, Vaseline etc.; coal tar-based softening agents such as coal tar, coal tar pitch etc.; fatty oil-based softening agents such as castor oil, linseed oil, rapeseed oil, soybean oil, coconut oil etc.; tolu oil; factice; wax such as beeswax, carnauba wax, lanoline etc.; fatty acids and fatty acid salts such as ricinoleic acid, palmitic acid, stearic acid, barium stearate, calcium stearate, zinc laurate etc.; naphthenic acid; pine oil, rosin or derivatives thereof; synthetic polymers such as terpene resin, petroleum resin, atactic polypropylene, chroman indene resin etc.; ester-based softening agents such as dioctyl phthalate, dioctyl adipate, dioctyl sebacate etc.; and microcrystalline wax, liquid polybutadiene, modified liquid polybutadiene, liquid Thiokol and hydrocarbon-based synthetic lubricating oil. Among these materials, the petroleum-based softening agents, particularly process oil, are preferably used.

The amount of these softening agents blended is selected suitably depending on the applications of the vulcanized product.

The aging inhibitor includes, for example, amine-based, phenol-based or sulfur-based aging inhibitors. These aging inhibitors are used in such a range that the object of the present invention is not hindered.

As the processing assistants, processing assistants used in processing of usual rubber can be used. Specific examples include higher fatty acids such as linoleic acid, ricinoleic acid, stearic acid, palmitic acid, lauric acid etc.; higher fatty acid salts such as barium stearate, zinc stearate, calcium stearate etc.; and esters of the above high fatty acids.

The processing assistants are used in a ratio of usually 10 parts by weight or less, preferably 5 parts by weight or less, to 100 parts of the rubber component, but desirably the optimum amount is determined depending on required physical properties.

The rubber composition used in the present invention may be compounded with a vulcanizing accelerator.

Specifically, the vulcanizing accelerator includes thiazole compounds such as N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole, dibenzothiazyl disulfide etc.; guanidine compounds such as diphenyl guanidine, triphenyl guanidine, diorthonitrile guanidine, orthonitrile biguanide, diphenyl guanidine phthalate etc.; aldehydamine and aldehyde-ammonia compounds such as acetaldehyde/aniline reaction product, butyl aldehyde/aniline condensate, hexamethylene tetramine, acetaldehyde ammonia, etc.; imidazoline compounds such as 2-mercaptoimidazoline etc.; thiourea compounds such as thiocarbanilide, diethyl thiourea, dibutyl thiourea, trimethyl thiourea, diorthotolylthiourea etc.; thiuram compounds such as tetramethyl thiuram monosulfide, tetramethyl thiuram disulfide, tetraethyl thiuram disulfide, tetrabutyl thiuram disulfide, pentamethylene thiuram tetrasulfide etc.; dithiocarbamate compounds such as zinc dimethyl dithiocarbamate, zinc diethyl dithiocarbamate, zinc di-n-butyl dithiocarbamate, zinc ethyl phenyl dithiocarbamate, zinc butyl phenyl dithiocarbamate, sodium dimethyl dithiocarbamate, selenium dimethyl dithiocarbamate, tellurium dimethyl dithiocarbamate etc.; xanthene compounds such as zinc dibutyl xanthogenate etc.; and compounds such as zinc oxide (zinc white).

The vulcanizing accelerators may be used singly, but a combination of two or more thereof is preferably used.

Specific examples of the foaming agent include inorganic foaming agents such as sodium bicarbonate, sodium carbonate, ammonium bicarbonate, ammonium carbonate, ammonium nitrite etc.; nitroso compounds such as N,N'-dimethyl-N,N'-dinitrosoterephthalamide, N,N'-dinitrosopentamethylene tetramine etc.; azo compounds such as azodicarbonamide, azobisisobutyronitrile, azobiscyclohexyl nitrile, azodiaminobenzene, barium azodicarboxylate etc.; sulfonyl hydrazide compounds such as benzene sulfonyl hydrazide, toluene sulfonyl hydrazide, p,p'-oxybis(benzenesulfonyl hydrazide) (OBSH), diphenyl sulfone-3,3'-disulfonyl hydrazide etc.; azide compounds such as calcium azide, 4,4'-diphenyl sulfonyl azide, p-toluene sulfonyl azide etc.

As the foaming agent, a plastic fine hollow body can also be used. The plastic fine hollow body is characterized by being expanded by heating. As the plastics serving as an outer shell of the fine hollow body, those having a softening temperature in a suitable range adapted to the curing temperature of the rubber composition may be selected.

The plastics are specifically polymers or copolymers of ethylene, styrene, vinyl acetate, vinyl chloride, vinylidene chloride, acrylonitrile, butadiene, chloroprene etc.; polyamides such as nylon 6, nylon 66 etc.; polyesters such as polyethylene terephthalate etc.

To increase the expansion coefficient, a volatile solvent and a volatile substance such as gas are contained preferably in the plastic fine hollow body.

The volatile substance is exemplified by hydrocarbons such as butane, isobutane etc.

As the plastic fine hollow body, the one having a particle size of usually 1 to 50 μm is used, and the shape is usually spherical, but is not particularly limited.

These foaming agents are used in an amount of usually 0.5 to 100 parts by weight, preferably 1 to 50 parts by weight, more preferably 1.5 to 40 parts by weight, relative to 100 parts by weight of the rubber component.

In the present invention, a foaming assistant can be used if necessary in combination with the foaming agent. The foaming assistant acts for reducing the decomposition temperature of the foaming agent, for promoting the decomposition of the foaming agent and for uniform foaming.

The foaming assistant includes, for example, organic acids such as salicylic acid, phthalic acid, stearic acid, oxalic acid etc., urea or derivatives thereof.

These foaming assistants are used usually in an amount of 0 to 30 parts by weight, preferably 0 to 15 parts by weight, more preferably 0 to 10 parts by weight, relative to 100 parts by weight of the rubber component, but the amount is determined desirably depending on required physical properties.

Liquid

In the present invention, the liquid used to adhere to the surface of the rubber composition is preferably a liquid containing an elementary substance consisting of a non-oxygen element in the group VI in the periodic table.

The non-oxygen element in the group VI in the periodic table includes, for example, sulfur, selenium, tellurium, and polonium calcogen (element in the oxygen group). Among these, sulfur is particularly preferable.

In addition to the elementary substance consisting of a non-oxygen element in the group VI in the periodic table, a compound comprising the non-oxygen element in the group VI in the periodic table may be contained in such a range that the object of the present invention can be achieved. However, the compound comprising the non-oxygen element in the group VI in the periodic table may not be contained. Such compounds include, for example, inorganic sulfur compounds, thiazole compounds, thiuram compounds, dithiocarbamate, disulfide compounds, xanthate compounds etc.

The element (excluding oxygen) in the VI group in the periodic table may be solid and liquid or may be mixed with water and/or an organic solvent and is used preferably as a solution and/or a dispersion.

When the dispersion is a liquid wherein the solid element (excluding oxygen) in the VI group in the periodic table is dispersed in water and/or an organic solvent, the dispersion is referred to sometimes as a suspension.

The solvent used in the above liquid includes solvents in which the element (excluding oxygen) in the group VI in the periodic table can be dissolved, or cannot be dissolved but can be used in a suspended state by stirring with a mixer etc. Specific examples include water; an alcohol such as methanol, ethanol and isopropyl alcohol, an organic solvent such as benzene, toluene, xylene and chloroform, or a mixed solvent thereof.

The liquid may contain a surfactant.

When the element (excluding oxygen) in the group VI in the periodic table is the one melted like sulfur, the element can be used as a dispersion with a surfactant without using a solvent. The dispersion is called sometimes a suspension.

In the treatment liquid used in the present invention, it is preferable that the element (excluding oxygen) in the group VI in the periodic table is particularly sulfur and contains a surfactant by which the sulfur is dispersed in water and/or an organic solvent.

The liquid includes, for example, a liquid containing 1 to 50 wt % elemental sulfur, 0.01 to 25 wt % dispersant, 0 to 1 wt % stabilizer and 24 to 98.99 wt % water, in 100 wt % dispersion.

As the elemental sulfur, particles passing through a 300-mesh screen, preferably a 500-mesh screen, are preferably used.

The elemental sulfur is used in an amount of usually 1 to 50 wt %, preferably 5 to 30 wt %, in 100 wt % dispersion.
<Dispersant>

The above liquid preferably contains a surfactant as a dispersant. As the dispersant, a known surfactant can be used, and specifically a nonionic surfactant, an anionic surfactant, a cationic surfactant and an amphoteric surfactant can be used.

The nonionic surfactant includes, for example, polyoxyalkylene alkyl ether, polyoxyalkylene higher alcohol ether, polyoxyalkylene alkyl phenyl ether, polyoxyalkylene fatty ester, polyvalent alcohol fatty ester, polyoxyalkylene polyvalent alcohol fatty ester, polyoxyalkylene fatty acid amide, sorbitan monofatty ester, sorbitan difatty ester, sorbitan trifatty ester, polyoxyalkylene sorbitan monofatty ester, polyoxyalkylene sorbitan difatty ester, polyoxyalkylene sorbitan trifatty ester, polyoxyalkylene sorbitol fatty ester, glycerin fatty ester, sucrose fatty ester, polyoxyalkylene hardened castor oil, polyoxyalkylene alkylamine, polyoxyalkylene fatty acid amide, alkylamine oxide etc.

The anionic surfactant includes, for example, alkali soap, metallic soap, organic base soap, alkyl sulfates, alkyl sulfonates, alkyl benzene sulfonates, alkyl naphthalane sulfonates, alkyl sulfosuccinates, alkyl phosphates, polyoxyalkylene alkyl ether sulfates, polyoxyalkylene alkyl phenyl ether sulfates, polyoxyalkylene alkyl ether sulfonates, and polycarboxylic acid-based polymeric surfactants.

The cationic surfactants include alkylamine salts, alkyl ammonium salts, alkyl pyridinium salts etc.

The amphoteric surfactants include alkyl betaine, aminocarboxylic acids, alkyl β-alanine, imidazoline etc.

These surfactants can be used singly or as a combination of two or more thereof. From the viewpoint of the shelf stability of the finally obtained dispersion, a nonionic surfactant containing ether oxygen is preferably used.

The surfactant is used in an amount of usually 1 to 50 parts by weight, preferably 10 to 30 parts by weight, relative to 100 parts by weight of the elemental sulfur.

Specifically, the dispersant is contained in an amount of usually 0.01 to 25 wt %, preferably 1 to 6 wt %, relative to 100 wt % of the liquid.
<Stabilizer>

The liquid which can be used in the present invention can contain a stabilizer if necessary. As the stabilizer, it is possible to use known stabilizers if necessary, among which polyvinyl alcohol (completely saponified or partially saponified, a polymerization degree of 1000 to 1700), polyethylene glycol, polypropylene glycol, ethylene glycol, propylene glycol copolymer, carboxymethyl cellulose and sodium polyacrylate are preferable, and polyvinyl alcohol (completely saponified, a polymerization degree of 1500 to 1700) is particularly preferable.

The stabilizer is used desirably in an amount of usually 0 to 10 parts by weight, preferably 0 to 5 parts by weight, relative to 100 parts by weight of the elemental sulfur.

Specifically, the stabilizer is contained in an amount of usually 0 to 1 wt %, preferably 0 to 0.5 wt %, relative to 100 wt % of the liquid.
<Dispersing Medium>

In the above liquid, a predetermined solvent may be used as the dispersing medium. The solvent used may be any known solvent insofar as it does not react with the elemental sulfur and non-crosslinked rubber to be crosslinked and can dissolve or disperse a dispersant and stabilizer described later.

Specific examples include water, organic solvents such as methanol, ethanol, isopropyl alcohol, acetone, hexane, heptane, benzene, toluene and xylene, and oil. These may be used alone or as a mixture of two or more thereof. Among these, water is preferable from the viewpoint of storage and safety. As water, water subjected to purification treatment, such as deionized water, purified water etc., is preferably used.

The dispersing medium is used desirably in an amount of usually 200 to 10000 parts by weight, preferably 286 to 2000 parts by weight, relative to 100 parts by weight of the elemental sulfur.

Method of Producing the Vulcanized Rubber Molded Product

In the method of producing the vulcanized rubber molded product (non-foamed product, foamed product) according to the present invention, a non-vulcanized rubber composition (including a non-vulcanized non-foamed rubber composition) is first prepared.

The non-vulcanized rubber composition used in the present invention can be prepared for example by kneading rubber (for example ethylene/α-olefin/non-conjugated polyene copolymer rubber) and if necessary additives such as a rubber reinforcing agent, an inorganic filler and a softening agent at a temperature of 80 to 170° C. for 2 to 20 minutes in a Banbury mixer, a kneader, an internal mixer such as intermix (closed mixer) and then mixing the resulting mixture with sulfur (vulcanizing agent) and if necessary a vulcanizing accelerator, or sulfur (vulcanizing agent) and if necessary a vulcanizing accelerator, a foaming agent and a foaming assistant, in a roll such as an open roll or a kneader and kneading the mixture at a roll temperature of 40 to 80° C. for 5 to 30 minutes, followed by gaging.

In the present invention, the non-vulcanized rubber composition containing rubber, a crosslinking agent and if necessary other additives such as a foaming agent is extruded usually via an extruder equipped with a die to form an intended product of predetermined shape and continuously vulcanized or vulcanized and foamed.

As the extruder, an extruder used for rubber can be usually used.

The shape of the product is not particularly limited, and for example, the shape of a weather strip, a glass run channel, an opening trim, or a hose can be mentioned. The non-vulcanized rubber composition is endowed with a desired product shape by extruding it through the die of the extruder usually.

In the present invention, droplets or spray of the treatment liquid are allowed to adhere to the surface of the non-vulcanized rubber composition having a predetermined shape while being discharged from the extruder and reaching a vulcanizing bath.

The treatment liquid is sprayed onto the surface of the non-vulcanized rubber composition having a product shape to form a coating thereon, and then the non-vulcanized rubber composition is introduced into a vulcanizing bath and heated at a temperature of 120 to 270° C. for 1 to 30 minutes, whereby the composition can be vulcanized or vulcanized and foamed. The step of vulcanization or vulcanization foaming is carried out usually continuously.

In the present invention, it is preferable that a coating of the treatment liquid is formed on the surface of the non-vulcanized rubber composition having a product shape, but spots of the treatment liquid may be formed on a minute part of the non-vulcanized rubber composition.

When the element (excluding oxygen) in the group VI in the periodic table, contained in the treatment liquid, is sulfur, the sulfur is substantially insoluble in any of the above solvents, and thus a dispersion, for example a suspension, is used preferably as the treatment liquid.

The method of allowing droplets or spray of the liquid containing the element (excluding oxygen) in the group VI in the periodic table to adhere to the surface of the non-vulcanized rubber composition is not particularly limited, and for example, droplets or spray generated by a spraying machinery can be brought directly or indirectly into contact with the surface of the non-vulcanized rubber composition.

The droplets and spray are evident to those skilled in the art. In the present invention, the size of droplets or spray is not particularly limited, but is preferably 1000 μm or less.

The surface of the non-vulcanized rubber composition to which the treatment liquid adheres may be throughout the product, but in respect of design, it is preferable that the treatment liquid adheres to the external surface of the product. The treatment liquid may also adhere to the internal surface of the product, but even if the treatment liquid does not adhere to the internal surface, there may not be any problem in respect of design.

The heating method in the vulcanizing bath includes, for example, heating means such as a heated air vulcanizing bath (HAV), a glass beads fluidized bed, an ultra-high frequency vulcanizing device (UHF), and steam can be used. The continuous extrusion line is preferably a combination of an extruder→spraying machinery→UHF→HAV or a combination of an extruder→spraying machinery→HAV→UHF→HAV.

In the method of producing the crosslinked rubber molded product according to the present invention, droplets or spray of the treatment liquid can adhere to the surface of the non-vulcanized rubber composition before the non-vulcanized rubber composition is shaped in a predetermined product shape.

For example, the treatment liquid is side-fed to a die, head or barrel of the rubber extruder and poured directly into the non-vulcanized rubber material before attaining a predetermined shape, whereby the treatment liquid can adhere to the surface (contacting with the die) of the rubber material having a predetermined shape after extrusion.

In the present invention, it is preferable in respect of productivity that the process is carried out successively from the step of shaping the non-vulcanized rubber composition in a predetermined product shape to the step of vulcanizing or vulcanizing foaming step.

According to the method of the present invention, it is possible to obtain a vulcanized rubber molded product wherein the amount of sulfur atoms present in the surface of the vulcanized rubber molded product is at least 1.2 times as high as the amount of sulfur atoms present in a cut face obtained by cutting the surface to a depth of 1.0 mm in the vertical direction.

In the method of producing the vulcanized rubber molded product according to the present invention, the improvement of foaming is preferably 1% or more. The improvement of foaming will be described in the Examples.

The vulcanized rubber molded product produced by the method of the present invention is preferably extruded sponge rubber or extruded solid rubber.

The vulcanized rubber molded product produced by the method of the present invention is preferably a foamed product having a specific gravity of 0.8 to 0.01, particularly 0.80 to 0.20, and a surface roughness (RzD) of 10 μm or less. This foamed product is used preferably in application to automobile weather strip sponge.

The automobile weather strip includes a composite product consisting of sponge rubber/solid rubber/metal. The sponge rubber and solid rubber are different from each other in respect of composition and are thus different from each other in the rate of vulcanization reaction upon heating in the vulcanizing bath, so that when the molding conditions are adapted to the side of the sponge rubber material, the design and physical properties of the solid rubber material are deteriorated, while when the conditions are adapted to the side of the solid rubber material, there frequently occur inconveniences in the side of the sponge material. Without using such composite products made of different materials, both rubber physical properties and design can be realized at high levels by the present invention.

The vulcanized rubber molded product produced by the method of the present invention is preferably a foamed product having a specific gravity of 0.81 to 1.10 and a surface roughness (RzD) of 6 μm or less. This foamed product is preferably finely foamed solid.

The method of measuring the specific gravity and surface roughness (RzD) will be described in the Examples.

The vulcanized rubber molded product is used preferably in any application selected from the group consisting of a weather strip, a glass run channel, an opening trim and a hose.

The extruded sponge includes, for example, highly foamed sponge, weather strip sponge, a finely foamed glass run channel, a finely foamed hose, etc.

The extruded solid includes, for example, a glass run channel, a trim, draining rubber, window frame sealing rubber, etc.

In the present invention, the vulcanized rubber molded product is preferably a foamed product.

The vulcanized rubber molded product of the present invention is used in automobile applications such as glass run channel products, window frame products, draining products, laces, automobile roofs, a sealing part around a trunk, hoses, foamed products, and rubber vibration insulators such as damper pulleys, engine mounts, strut mounts, muffler hangers, bushes etc. The vulcanized rubber molded product is also used in building materials such as sash gaskets, building joint products and highly foamed sponge.

EXAMPLES

Hereinafter, the present invention is described in more detail by reference to the Examples, but the present invention is not limited to the Examples.

The method of measuring physical properties of copolymer rubber used in the Examples and Comparative Examples and physical properties of the resulting vulcanized rubber products is as follows.

(1) Improvement of Foaming Efficiency

The improvement of foaming efficiency was calculated according to the following equation:

Improvement of foaming efficiency $(\%) = (1 - r_B/r_A) \times 100$ wherein $r_A$ is the specific gravity of a tubular or string vulcanized rubber foamed molded product produced without application of the surface treatment technique using the treatment liquid of the present invention, and $r_B$ is the specific gravity of a tubular or string vulcanized rubber foamed molded product produced by using this technique.

(2) Specific Gravity

From a tubular or string vulcanized rubber (foamed) molded product vulcanized with hot air, a 20 mm×20 mm test specimen was punched off and smuts on the surface were wiped away with alcohol.

Using an automatic specific gravity meter (M-1 type automatic specific gravity meter manufactured by Toyo Seiki Seisaku-sho, Ltd.), the specific gravity (SG) of the test specimen in an atmosphere at 25° C. was determined by calculating the difference between the weight of the test specimen in air and the weight of the test specimen in purified water.

(3) Water Absorptivity

From a tubular or string vulcanized rubber foamed molded product vulcanized with hot air, a 20 mm×20 mm test specimen was punched off and smuts on the surface were wiped away with alcohol.

Then, distilled water was introduced into a container capable of decompression, and the test specimen was dipped in a position 50 mm below the water surface, and then the air on the water surface was decompressed to 130 mmHg with a rotary pump and then maintained for 3 minutes. Then, the pressure was returned to the atmospheric pressure, and 3 minutes later, the weight of the test specimen having adsorbed water was measured, and the water adsorptivity (Wa) was calculated from the following equation:

$Wa(\%) = \{(W2 - W1)/W1\} \times 100$ wherein W1 is the weight (g) of the test specimen before dipping, and W2 is the weight (g) of the test specimen after dipping.

(4) Compression Set (CS)

A tubular or string vulcanized rubber (foamed) molded product vulcanized with hot air was cut into a test specimen having a length of 30 mm, and then attached to a jig for measuring compression set.

Then, the test specimen was compressed such that the height of the test specimen was reduced to ½ relative to the height before application of loading, and the specimen together with the jig was placed in a gear oven at 70° C. and heat-treated for 200 hours.

After heat treatment, the test specimen was removed from the compressing machine and then cooled for 30 minutes, and the height of the test specimen was measured, and the compression set (CS) was calculated from the following equation:

$CS(\%) = [(t_0 - t_1)/(t_0 - t_2)] \times 100$ wherein $t_0$: height of the test specimen before the test.

$t_1$: height of the test specimen which was heat-treated and then left and cooled for 30 minutes.

$t_2$: height of the test specimen attached to the measurement jig.

(5) Surface Roughness (RzD)

A tubular or string vulcanized rubber (foamed) molded product obtained by continuous extrusion vulcanizing molding was cut into a test specimen of 30 mm in length to prepare a surface roughness measurement sample. Surface roughness was measured by using a surface roughness meter manufactured by Tokyo Seimitsu Co., Ltd. Specifically, the needle top of the surface roughness meter was placed on the top of the tubular or string vulcanized rubber (foamed) molded product, and a surface roughness test was conducted under the conditions of a scanning rate of 0.3 mm/s and a scanning range of 1 cm. The surface roughness (RzD; unit μm) was determined according to JIS B 0601.

(6) Shape Retention

Tubular sponge rubber vulcanized with continuous hot air vulcanization was cut into a specimen having a length of 2 mm, and using a magnifying glass, length A and width B were measured respectively as the inner diameter of the tubular sponge rubber 1 shown in FIG. 1, and the shape retention was calculated from the following equation.

Shape retention$(\%) = [(\text{dimension of length } A)/(\text{dimension of width } B)] \times 100$ (7) Evaluation of Abrasion Resistance Using an abrasion testor manufactured by Ueshima Seisakusho Co., Ltd., abrasion resistance was evaluated under the following evaluation criteria after rubbing a test specimen 100 times with sand paper #80 under a loading of 500 g.

Evaluation 1: Deep traces of sand paper remain in the rubbing direction, and the rubber is shaved.

Evaluation 2: Slight traces of sand paper remain in the rubbing direction, and there are parts where the rubber is shaved.

Evaluation 3: No traces of sand paper remain in the rubbing direction, and there is no part where the rubber is shaved.

(8) Tensile Strength and Elongation

A test specimen was obtained by punching in No. 3 dumbbell shape described in JIS K6301 (1989).

This test specimen was examined in a tensile test at a measurement temperature of 25° C. at a stress rate of 500 mm/min. according to a method stipulated under JIS K6301, Item 3, to determine tensile strength ($T_B$) and elongation ($E_B$).

(9) Quantification of Sulfur Atoms Present in the Surface and the Inside of the Vulcanized Rubber Molded Product The surface of the rubber product was washed 5 times or more with new absorbent cotton impregnated with ethanol, and then dried, and X ray photoelectron spectroscopy (XPS) with SSX-100 manufactured by SSI to determine its elemental composition. The X-ray source used was monochromatic AlKα. Integration was conducted 200 times.

The amount of sulfur atoms present in the inside of the vulcanized rubber molded product was determined by cutting the surface of the molded product to a depth of 1.0 mm in the vertical direction to form a cut face having a size of 10 mm×10 mm, and then analyzing the cut face. That is, the analysis of the internal surface of the vulcanized rubber molded product was conducted.

The ethylene/propylene/non-conjugated polyene copolymer rubbers used in the Examples and Comparative Examples are as follows.

(1) Ethylene/propylene/non-conjugated polyene copolymer rubber (EPT-A) manufactured by Mitsui Chemicals, Inc.
    Ethylene/propylene molar ratio: 68/32
    Non-conjugated polyene: 5-ethylidene-2-norbornene (ENB)
    Iodine value: 24 (g/100 g)
    Intrinsic viscosity [η] measured in decalin at 135° C.: 1.7 dl/g (2) Ethylene/propylene/non-conjugated polyene copolymer rubber (EPT-B) manufactured by Mitsui Chemicals, Inc.
    Ethylene/propylene molar ratio: 68/32
    Non-conjugated polyene: 5-ethylidene-2-norbornene (ENB)
    Iodine value: 13 (g/100 g)
    Intrinsic viscosity [η] measured in decalin at 135° C.: 1.7 dl/g (3) Ethylene/propylene/non-conjugated polyene copolymer rubber (EPT-C) manufactured by Mitsui Chemicals, Inc.
    Ethylene/propylene molar ratio: 63/37
    Non-conjugated polyene: 5-ethylidene-2-norbornene (ENB)
    Iodine value: 22 (g/100 g)
    Intrinsic viscosity [η] measured in decalin at 135° C., 1.5 dl/g (4) Ethylene/propylene/non-conjugated polyene copolymer rubber (EPT-D) manufactured by Mitsui Chemicals, Inc.
    Ethylene/propylene molar ratio: 65/35
    Non-conjugated polyene: DCPD
    Iodine value: 22 (g/100 g)
    Intrinsic viscosity [η] measured in decalin at 135° C., 2.8 dl/g

Example 1

Preparation of Non-Vulcanized Non-Foamed Rubber Composition and Vulcanized Rubber Foamed Product First, 120.0 parts by weight of ethylene/propylene/non-conjugated polyene copolymer rubber (EPT-A) were masticated for 30 seconds, and then 5.0 parts by weight of zinc white No. 1, 1.0 part by weight of stearic acid and 50.0 parts by weight of a softening agent [trade name: Dianaprocess PW-380, paraffin oil manufactured by Idemitsu Kosan Co., Ltd.] were added thereto, and finally 90.0 parts by weight of SRF carbon black [trade name: Asahi #50HG, manufactured by Asahi Carbon Co., Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 1.5 parts of a vulcanizing agent sulfur, 2.0 parts of 2-mercaptobenzothiazole (MBT) [trade name: Sunseller MBT manufactured by Sanshin Chemical Industry Co., Ltd.], 1.25 parts by weight of zinc dibutyldithiocarbamate (ZnBDC) [trade name: Sunseller ZnBDC manufactured by Sanshin Chemical Industry Co., Ltd.], 0.25 parts by weight of zinc dimethyldithiocarbamate (ZnMDC) [trade name: Sunseller ZnMDC manufactured by Sanshin Chemical Industry Co., Ltd.] and 1.0 part by weight of 2-mercapto-2-imidazoline (EU) [trade name: Sunseller EU manufactured by Sanshin Chemical Industry Co., Ltd.] as vulcanizing accelerators, 4.0 parts by weight of an OBSH-based foaming agent [trade name: Neocerbon #N1000SW manufactured by Eiwa Chemical Ind. Co., Ltd.] and 2.0 parts by weight of a hygroscopic agent [trade name: Besta #20 manufactured by Inoue Sekkai Kogyo Co., Ltd.] were added thereto and dispersed and kneaded for 6 minutes, and the kneaded product was gaged into a ribbon of 10 mm in thickness and 70 mm in width to give a non-vulcanized non-foamed rubber composition.

Figure 2:
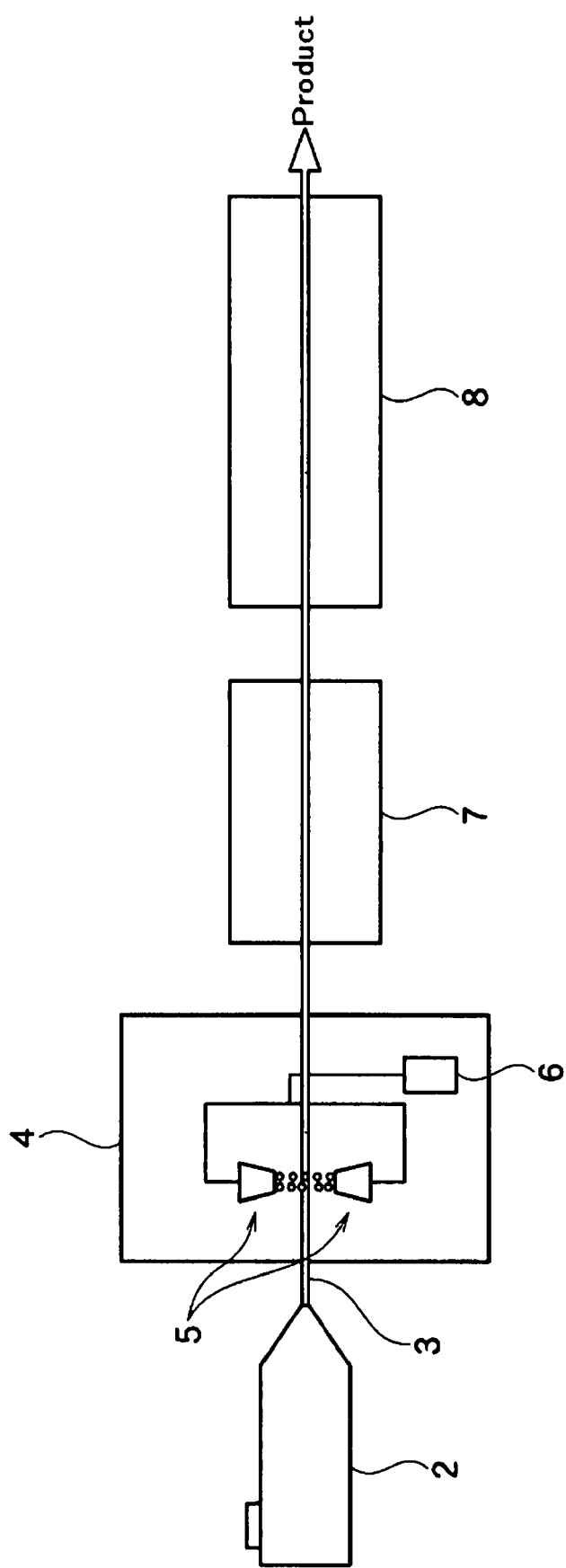
FIG. 2 is a schematic view of a continuous extrusion line used in the Examples in the present invention.

As shown in FIG. 2, the rubber composition thus obtained was introduced into a φ60 mm rubber extruder 2, and then the extruded non-vulcanized non-foamed rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), whereby the tubular non-vulcanized rubber having an inner diameter of 10 mm and an outer diameter of 11 mm (thickness 1 mm), extruded through a die of the rubber extruder, was vulcanized and foamed to give sponge rubber.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

A treatment liquid (1) 6 prepared in a manner described later was sprayed by the spraying device 4 onto the surface of the non-vulcanized non-foamed rubber composition 3 until the non-vulcanized non-foamed rubber composition 3 reached the UHF vulcanizing bath 7. In the spraying method, a compressor was combined with a pressure-sending tank, and a spraying gun (HM-3: nozzle diameter 1.0 mm) 5 manufactured by Fuso Seiki Co., Ltd. was used.

Preparation of Treatment Liquid (1)

Weighed powdery sulfur (Karuizawa Seirensho) was added to water, and a surfactant [polymethacrylic acid and dodecyl trimethyl ammonium bromide] was added thereto, and this mixture was passed through a mesh 500 to remove powdery sulfur aggregates, whereby a spraying suspension was obtained. This suspension was used as the treatment liquid (1).

The composition of the treatment liquid (1) obtained in this manner was 10 wt % powdery sulfur (vulcanizing agent), 85.8 wt % water, and 4.2 wt % surfactant (2.0 wt % polymethacrylic acid and 2.2 wt % dodecyl trimethyl ammonium bromide).

For the above preparation method, "Suiyosei Kobunshino Saishin Gijyutsu" (Newest Technology of Water-Soluble Polymer) (published by CMC and authored by Teruo Horiuchi, p. 23 (2000)) was referred to.

According to the methods described above, the vulcanized rubber foamed product (weather strip sponge) obtained in the manner described above was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

Example 2

A tubular vulcanized rubber foamed product (weather strip sponge product) was obtained in the same manner as in Example 1 except that a treatment liquid (2) having the following composition prepared in the same manner as in the method of preparing the treatment liquid (1) was used in place of the treatment liquid (1).

The composition of the treatment liquid (2) was 5 wt % powdery sulfur (vulcanizing agent), 5 wt % tetramethyl thiuram disulfide (vulcanizing accelerator) [trade name: Sunseller TT manufactured by Sanshin Chemical Industry Co., Ltd.], 85.8 wt % water, and 4.2 wt % surfactant (2.0 wt % polymethacrylic acid and 2.2 wt % dodecyl trimethyl ammonium bromide).

According to the methods described above, the vulcanized rubber foamed product thus obtained was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

Example 3

A tubular vulcanized rubber foamed product (weather strip sponge product) was obtained in the same manner as in Example 1 except that a treatment liquid (3) having the following composition prepared in the same manner as in the method of preparing the treatment liquid (1) was used in place of the treatment liquid (1).

The composition of the treatment liquid (3) was 5 wt % powdery sulfur (vulcanizing agent), 5 wt % zinc-di-n-butyl dithiocarbamate (vulcanizing accelerator) [trade name: Sunseller Bz manufactured by Sanshin Chemical Industry Co., Ltd.], 85.8 wt % water, and 4.2 wt % surfactant (2.0 wt % polymethacrylic acid and 2.2 wt % dodecyl trimethyl ammonium bromide).

According to the methods described above, the vulcanized rubber foamed product thus obtained was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

Example 4

A non-vulcanized non-foamed rubber composition was obtained in the same manner as in Example 1 except that the amount of the foaming agent blended was changed from 4.0 parts by weight to 2.0 parts by weight.

Using this rubber composition, a tubular vulcanized rubber foamed product (weather strip sponge product) was obtained in the same manner as in Example 1.

According to the methods described above, the vulcanized rubber foamed product thus obtained was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

Comparative Example 1

A tubular vulcanized rubber foamed product (weather strip sponge product) was obtained in the same manner as in Example 1 except that the surface treatment with the treatment liquid (1) was not conducted.

According to the methods described above, the vulcanized rubber foamed product thus obtained was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

Comparative Example 2

A tubular vulcanized rubber foamed product (weather strip sponge product) was obtained in the same manner as in Example 4 except that the surface treatment with the treatment liquid (1) was not conducted.

According to the methods described above, the vulcanized rubber foamed product thus obtained was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 1.

TABLE 1

|  | Example 1 | Example 2 | Example 3 | Example 4 | Comparative Example 1 | Comparative Example 2 |
|---|---|---|---|---|---|---|
| Treatment liquid | (1) | (2) | (3) | (1) | Not treated | Not treated |
| Method of applying the treatment liquid | Spray system | Spray system | Spray system | Spray system |  |  |
| Surface roughness (μm) |  |  |  |  |  |  |
| Surface of the product | 5 | 3 | 3 | 5 | 18 | 17 |
| Internal surface of the hollow in the product | 22 | 22 | 22 | 22 | 22 | 19 |
| Shape retention (%) | 85 | 82 | 80 | 88 | 65 | 62 |
| Mechanical strength properties |  |  |  |  |  |  |
| TB (MPa) | 3.8 | 3.9 | 3.9 | 4.3 | 3.2 | 3.8 |
| EB (%) | 280 | 290 | 290 | 350 | 240 | 260 |
| Compression set (%) | 14 | 15 | 15 | 14 | 20 | 22 |
| Evaluation of abrasion resistance Evaluation | 3 | 3 | 3 | 3 | 1 | 1 |
| Specific gravity | 0.42 | 0.41 | 0.41 | 0.61 | 0.48 | 0.7 |
| Improvement of foaming efficiency (%) | 13 | 15 | 15 | 13 | 0 | 0 |
| Water adsorptivity (%) | 0.5 | 0.8 | 0.7 | 0.5 | 35 | 29 |
| Amount of present sulfur (atom-%) |  |  |  |  |  |  |
| Surface of the product | 0.6 | 0.5 | 0.5 | 0.5 | 0.2 | 0.2 |
| Inside of the product | 0.3 | 0.3 | 0.3 | 0.3 | 0.3 | 0.3 |
| Ratio of present sulfur | 2.0 | 1.7 | 1.7 | 1.7 | 0.7 | 0.7 |

From Table 1, the following can be understood.

The vulcanized rubber foamed product in Example 1 obtained by the surface treatment method of spraying the sulfur suspension (treatment liquid (1)) onto the surface of the non-vulcanized non-foamed rubber composition is extremely superior in surface smoothness to the vulcanized rubber foamed product in Comparative Example 1 obtained without using the surface treatment method. This is because by spraying the treatment liquid (1), the concentration of the vulcanizing agent in the surface of the non-vulcanized non-foamed rubber composition becomes so high that the vulcanization reaction proceeds rapidly. The surface rapidly forms a vulcanized rubber state, and as a result, the deformation of the extruded product (deterioration in shape retention) by heating in the vulcanizing bath is relaxed, and high shape retention and low water adsorptivity can be achieved. Further, the leakage of gas caused by the foaming agent from the surface of the non-vulcanized non-foamed rubber composition is reduced, and thus the specific gravity is reduced. That is, the foaming agent may be added in a smaller amount to achieve desired specific gravity, thus contributing to reducing the cost. The improvement of foaming efficiency in the vulcanized rubber foamed product in Example 1 was 13%.

From the results in Examples 2 and 3, it was revealed that the same effect was also achieved when the type of the suspension was changed.

Example 4 is the case where the amount of the defoaming agent was reduced from 4 phr to 2 phr. The effect of the present invention can also be achieved even if the amount of the defoaming agent was reduced, as compared with Comparative Example 2 where the amount of the defoaming agent was similarly reduced.

In Examples 1 to 4 where the treatment liquid of the present invention is used, the mechanical strength, elongation, compression set, and abrasion resistance of the vulcanized rubber foamed product are improved. It is understood that the surface smoothness index RzD of a part coated with the treatment liquid of the present invention is significantly improved as compared with the vulcanized rubber foamed products obtained in Comparative Examples 1 and 2 where the treatment liquid of the present invention is not used.

When the amount of sulfur present in the surface of the vulcanized rubber is at least 1.2 times as high as the amount of sulfur present in the surface and the inside of the vulcanized rubber, excellent rubber physical properties and design are exhibited. The amount of sulfur present in the surface of the vulcanized rubber foamed products obtained in Comparative Examples 1 and 2 is low and identical with the amount of sulfur present in the inside of the products.

Example 5

Preparation of Non-Vulcanized Non-Foamed Rubber Composition and Vulcanized Rubber Foamed Product First, 110.0 parts by weight of ethylene/propylene/non-conjugated polyene copolymer rubber (EPT-B) were masticated for 30 seconds, and then 5.0 parts by weight of zinc white No. 1, 1.0 part by weight of stearic acid and 55.0 parts by weight of a softening agent [trade name: Dianaprocess PW-380, paraffin oil manufactured by Idemitsu Kosan Co., Ltd.] were added thereto, and finally 170.0 parts by weight of FEF carbon black [trade name: Asahi #60G, manufactured by Asahi Carbon Co., Ltd.] and 15.0 parts by weight of heavy calcium carbonate [trade name: Whitone SB manufactured by Shiraishi Calcium Kaisha, Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 0.8 part of a vulcanizing agent sulfur, 1.0 part of 2-(4'-morpholinodithio)benzothiazole (MDB) [trade name: Nocseller MDM manufactured by Ouchishinko Chemical Industrial Co., Ltd.], 0.4 part by weight of tetrabutyl thiuram disulfide (TBTD) [trade name: Sunseller TBTD manufactured by Sanshin Chemical Industry Co., Ltd.], 0.4 part by weight of zinc dibutyldithiocarbamate (ZnBDC) [trade name: Sunseller ZnBDC manufactured by Sanshin Chemical Industry Co., Ltd.] and 0.4 part by weight of 2-mercapto-2-imidazoline (EU) [trade name: Sunseller EU manufactured by Sanshin Chemical Industry Co., Ltd.] as vulcanizing accelerators, 0.5 part by weight of an OBSH-based foaming agent [trade name: Neocerbon #N1000SW manufactured by Eiwa Chemical Ind. Co., Ltd.] and 5.0 parts by weight of a hygroscopic agent [trade name: Besta #BS manufactured by Inoue Sekkai Kogyo Co., Ltd.] were added thereto and dispersed and kneaded for 6 minutes, and the kneaded product was gaged into a ribbon of 10 mm in thickness and 70 mm in width to give a non-vulcanized non-foamed rubber composition.

As shown in FIG. 2, the rubber composition thus obtained was introduced into a φ460 mm rubber extruder 2, and then the extruded non-vulcanized non-foamed rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), to give a cylindrical vulcanized rubber foamed product (slightly foamed solid product (finely foamed sponge product)) having a diameter of 9 mm.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

The treatment liquid (1) 6 was sprayed by the spraying device 4 onto the surface of the non-vulcanized non-foamed rubber composition 3 until the non-vulcanized non-foamed rubber composition 3 reached the UHF vulcanizing bath 7. In the spray method, a compressor was combined with a pressure-sending tank, and a spraying gun (HM-3: nozzle diameter 1.0 mm) 5 manufactured by Fuso Seiki Co., Ltd. was used.

According to the methods described above, the solid product thus obtained was measured for the surface roughness of the product, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 2.

Example 6

A non-vulcanized non-foamed rubber composition was prepared in the same manner as in Example 5 except that the amount of the foaming agent blended was changed from 0.5 part by weight to 0.2 part by weight.

Using this rubber composition, a cylindrical vulcanized rubber foamed product (slightly foamed solid product (finely foamed sponge product)) having a diameter of 9 mm was obtained in the same manner as in Example 5.

According to the methods described above, the solid product thus obtained was measured for the surface roughness of the product, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 2.

Comparative Example 3

A cylindrical vulcanized rubber foamed product (slightly foamed solid product (finely foamed sponge product)) having a diameter of 9 mm was prepared in the same manner as in Example 5 except that the surface treatment with the treatment liquid (1) was not conducted.

According to the methods described above, the solid product thus obtained was measured for the surface roughness of the product, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 2.

Comparative Example 4

A cylindrical vulcanized rubber foamed product (slightly foamed solid product (finely foamed sponge product)) having a diameter of 9 mm was prepared in the same manner as in Example 6 except that the surface treatment with the treatment liquid (1) was not conducted.

According to the methods described above, the solid product thus obtained was measured for the surface roughness of the product, tensile strength at break ($T_B$), elongation ($E_B$), compression set (CS), abrasion resistance, specific gravity, improvement of foaming efficiency, water absorptivity, and the amount of sulfur present in the surface and the inside of the product.

The results are shown in Table 2.

TABLE 2

|  | Example 5 | Example 6 | Comparative Example 3 | Comparative Example 4 |
|---|---|---|---|---|
| Treatment liquid | (1) | (1) | Not treated | Not treated |
| Method of applying the treatment liquid | Spray system | Spray system |  |  |
| Surface roughness (μm) Surface of the product | 5 | 5 | 25 | 19 |
| Mechanical strength properties |  |  |  |  |
| TB (MPa) | 10.2 | 11.2 | 8.7 | 9.1 |
| EB (%) | 300 | 330 | 270 | 260 |
| Compression set(%) | 30 | 34 | 45 | 47 |

TABLE 2-continued

|  | Example 5 | Example 6 | Comparative Example 3 | Comparative Example 4 |
|---|---|---|---|---|
| Evaluation of abrasion resistance Evaluation | 3 | 3 | 2 | 2 |
| Specific gravity | 0.88 | 0.95 | 0.95 | 1.01 |
| Improvement of foaming efficiency(%) | 7 | 6 | 0 | 0 |
| Water adsorptivity (%) | 0.1 | 0.1 | 0.2 | 0.1 |
| Amount of present sulfur (atom-%) | | | | |
| Surface of the product | 0.5 | 0.5 | 0.2 | 0.2 |
| Inside of the product | 0.2 | 0.2 | 0.2 | 0.2 |
| Ratio of present sulfur | 2.5 | 2.5 | 1.0 | 1.0 |

From Table 2, the following can be understood.

In preparation of the non-vulcanized non-foamed rubber composition, 0.5 part of OBSH-based foaming agent was blended in Example 5, and 0.2 part of OBSH-based foaming agent was blended in Example 6. In Comparative Example 3 corresponding to Example 5 and in Comparative Example 4 corresponding to Example 6, the surface treatment method in the present invention is not used. In the finely foamed sponge products (slightly foamed solid products) obtained in Comparative Examples 3 and 4, the ratio of present sulfur is 1.0, and the products are poor in surface smoothness. On the other hand, the finely foamed sponge products obtained in Examples 5 and 6 wherein the ratio of present sulfur is 2.5 are superior in mechanical strength and elongation to the finely foamed sponge products obtained in Comparative Examples 3 and 4, and improve abrasion resistance.

Example 7

Preparation of Non-Vulcanized Non-Foamed Rubber Composition and Vulcanized Rubber Foamed Product First, 100.0 parts by weight of ethylene/propylene/non-conjugated polyene copolymer rubber (EPT-C) were masticated for 30 seconds, and then 5.0 parts by weight of zinc white No. 1, 2.0 parts by weight of stearic acid and 50.0 parts by weight of a softening agent [trade name: Dianaprocess PW-380, paraffin oil manufactured by Idemitsu Kosan Co., Ltd.] were added thereto, and finally 50.0 parts by weight of SRF carbon black [trade name: Asahi #50HG, manufactured by Asahi Carbon Co., Ltd.] and 200.0 parts by weight of heavy calcium carbonate [trade name: Whitone SB manufactured by Shiraishi Calcium Kaisha, Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 2.0 parts of a vulcanizing agent sulfur, 2.0 parts of 2-mercaptobenzothiazole (MBT) [trade name: Sunseller MBT manufactured by Sanshin Chemical Industry Co., Ltd.], 0.8 part by weight of zinc dibutyldithiocarbamate (ZnBDC) [trade name: Sunseller ZnBDC manufactured by Sanshin Chemical Industry Co., Ltd.], 0.8 part by weight of zinc dimethyldithiocarbamate (ZnMDC) [trade name: Sunseller ZnMDC manufactured by Sanshin Chemical Industry Co., Ltd.] and 2.0 parts by weight of N,N'-diethylthiourea (DEU) [trade name: Sunseller DEU manufactured by Sanshin Chemical Industry Co., Ltd.] as vulcanizing accelerators, 7.0 parts by weight of azodicarbonamide [trade name: Vinyhole AC#LQ manufactured by Eiwa Kasei Kogyo] as a foaming agent, and 7.0 parts by weight of an urea-based foaming assistant [tradename: Cell Paste 101W, manufactured by Eiwa Chemical Ind. Co., Ltd.] were added thereto and dispersed and kneaded for 6 minutes, and the kneaded product was gaged into a ribbon of 10 mm in thickness and 70 mm in width to give a non-vulcanized non-foamed rubber composition.

As shown in FIG. 2, the rubber composition thus obtained was introduced into a φ60 mm rubber extruder 2, and then the extruded non-vulcanized non-foamed rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), to give a tubular vulcanized rubber foamed product having an outer diameter of 30 mm and an inner diameter of 24 mm.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

The treatment liquid (1) 6 was sprayed by the spraying device 4 onto the surface of the non-vulcanized non-foamed rubber composition 3 until the non-vulcanized non-foamed rubber composition 3 reached the UHF vulcanizing bath 7. In the spray method, a compressor was combined with a pressure-sending tank, and a spraying gun (HM-3: nozzle diameter 1.0 mm) 5 manufactured by Fuso Seiki Co., Ltd. was used.

According to the methods described above, the vulcanized rubber foamed product thus obtained was measured for the surface roughness of the product, the surface roughness of the internal surface of the hollow, tensile strength at break ($T_B$), tensile elongation at break ($E_B$), compression set (CS), specific gravity, improvement of foaming efficiency, and the amount of sulfur present in the surface and the inside of the product.

The results are shown in Table 3.

Comparative Example 5

A tubular vulcanized rubber foamed product having an outer diameter of 30 mm and an inner diameter of 24 mm was prepared in the same manner as in Example 7 except that the surface treatment with the treatment liquid (1) was not conducted.

According to the methods described above, the vulcanized rubber foamed product thus obtained was measured for the surface roughness of the product, the surface roughness of the internal surface of the hollow, tensile strength at break ($T_B$), tensile elongation at break ($E_B$), compression set (CS), specific gravity, improvement of foaming efficiency, and the amount of sulfur present in the surface and the inside of the product.

The results are shown in Table 3.

TABLE 3

|  | Example 7 | Comparative Example 5 |
|---|---|---|
| Treatment liquid | (1) | Not treated |
| Method of applying the treatment liquid | Spray system |  |
| Surface roughness (μm) |  |  |
| Surface of the product | 5 | 14 |
| Internal surface of the hollow in the product | 16 | 17 |
| Mechanical strength properties |  |  |
| TB (MPa) | 0.8 | 0.5 |
| EB (%) | 180 | 120 |
| Compression set (%) | 18 | 23 |
| Evaluation of abrasion resistance Evaluation | 3 | 1 |
| Specific gravity | 0.03 | 0.09 |
| Improvement of foaming efficiency (%) | 66 | 0 |
| Amount of present sulfur (atom-%) |  |  |
| Surface of the product | 0.6 | 0.2 |
| Inside of the product | 0.3 | 0.3 |
| Ratio of present sulfur | 2.0 | 0.7 |

From Table 3, the following can be understood.

In the ultra-low-specific-gravity sponge product prepared in Example 7 by using the surface treatment method of the present invention, the ratio of present sulfur is 2.0, and the surface smoothness is improved, and the improvement of foaming efficiency is extremely high. In the ultra-low-specific-gravity sponge product prepared in Comparative Example 5 without using the surface treatment method of the present invention, on the other hand, the ratio of present sulfur is 0.7, and the product is poor in surface smoothness.

Example 8

Preparation of Non-Vulcanized Non-Foamed Rubber Composition and Vulcanized Rubber Foamed Product First, 120.0 parts by weight of ethylene/propylene/non-conjugated polyene copolymer rubber (EPT-A) were masticated for 30 seconds, and then 5.0 parts by weight of zinc oxide, 2.0 parts by weight of stearic acid and 50.0 parts by weight of a softening agent [trade name: Dianaprocess PW-380, paraffin oil manufactured by Idemitsu Kosan Co., Ltd.] were added thereto and finally 100.0 parts by weight of SRF carbon black [trade name: Asahi #50HG, manufactured by Asahi Carbon Co., Ltd.] and 30.0 parts by weight of heavy calcium carbonate [trade name: Whitone SB manufactured by Shiraishi Calcium Kaisha, Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 0.7 part of a vulcanizing agent sulfur, 2.0 parts of 2-mercaptobenzothiazole (MBT) [trade name: Sunseller MBT manufactured by Sanshin Chemical Industry Co., Ltd.], 0.8 part by weight of zinc dibutyldithiocarbamate (Zn-BDC) [trade name: Sunseller ZnBDC manufactured by Sanshin Chemical Industry Co., Ltd.] and 0.8 part by weight of zinc diethyldithiocarbamate (ZnEDC) [trade name: Sunseller ZnEDC manufactured by Sanshin Chemical Industry Co., Ltd.] as vulcanizing accelerators, 10.0 parts by weight of N,N'-dinitrosopentamethylenetetramine (DPT) [trade name: Celler D manufactured by Eiwa Chemical Ind. Co., Ltd.] as a foaming agent and 11.0 parts by weight of a foaming assistant [trade name: Cell Paste K5 manufactured by Eiwa Chemical Ind. Co., Ltd.] were added thereto and dispersed and kneaded for 6 minutes, and the kneaded product was gaged into a ribbon of 10 mm in thickness and 70 mm in width to give a non-vulcanized non-foamed rubber composition.

As shown in FIG. 2, the rubber composition thus obtained was introduced into a φ60 mm rubber extruder 2, and then the extruded non-vulcanized non-foamed rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), to give a tubular vulcanized rubber foamed product having an outer diameter of 30 mm and an inner diameter of 20 mm.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

The treatment liquid (1) 6 was sprayed by the spraying device 4 onto the surface of the non-vulcanized non-foamed rubber composition 3 until the non-vulcanized non-foamed rubber composition 3 reached the UHF vulcanizing bath 7. In the spraying method, a compressor was combined with a pressure-sending tank, and a spraying gun (HM-3: nozzle diameter 1.0 mm) 5 manufactured by Fuso Seiki Co., Ltd. was used.

According to the methods described above, the vulcanized rubber foamed product thus obtained was measured for the surface roughness of the product, the surface roughness of the internal surface of the hollow, tensile strength at break ($T_B$), tensile elongation at break ($E_B$), compression set (CS), specific gravity, improvement of foaming efficiency, and the amount of sulfur present in the surface and the inside of the product.

The results are shown in Table 4.

Comparative Example 6

A tubular vulcanized rubber foamed product having an outer diameter of 28 mm and an inner diameter of 20 mm was prepared in the same manner as in Example 8 except that the surface treatment with the treatment liquid (1) was not conducted.

According to the methods described above, the vulcanized rubber foamed product thus obtained was measured for the surface roughness of the product, the surface roughness of the internal surface of the hollow, tensile strength at break ($T_B$), tensile elongation at break ($E_B$), compression set (CS), specific gravity, improvement of foaming efficiency, and the amount of sulfur present in the surface and the inside of the product.

The results are shown in Table 4.

TABLE 4

| | Example 8 | Comparative Example 6 |
|---|---|---|
| Treatment liquid | (1) | Not treated |
| Method of applying the treatment liquid | Spray system | |
| Surface roughness (μm) | | |
| Surface of the product | 5 | 14 |
| Internal surface of the hollow in the product | 15 | 15 |
| Mechanical strength properties | | |
| TB(MPa) | 1.6 | 0.9 |
| EB(%) | 280 | 220 |
| Compression set (%) | 45 | 55 |
| Evaluation of abrasion resistance Evaluation | 3 | 1 |
| Specific gravity | 0.19 | 0.32 |
| Improvement of foaming efficiency (%) | 41 | 0 |
| Amount of present sulfur (atom-%) | | |
| Surface of the product | 0.6 | 0.2 |
| Inside of the product | 0.3 | 0.3 |
| Ratio of present sulfur | 2.0 | 0.7 |

From Table 4, the following can be understood.

In the thermally insulating sponge product prepared in Example 8 by using the surface treatment method of the present invention, the ratio of present sulfur is 2.0, and the surface smoothness is improved, and the improvement of foaming efficiency is extremely high. In the thermally insulating sponge product prepared in Comparative Example 6 without using the surface treatment method of the present invention, on the other hand, the ratio of present sulfur is 0.7, and the product is poor in surface smoothness.

Example 9

Preparation of Non-Vulcanized Rubber Composition and Vulcanized Rubber Foamed Product First, 110.0 parts by weight of ethylene/propylene/non-conjugated polyene copolymer rubber (EPT-B) were masticated for 30 seconds, and then 5.0 parts by weight of zinc oxide, 1.0 part by weight of stearic acid and 55.0 parts by weight of a softening agent [trade name: Dianaprocess PW-380, paraffin oil manufactured by Idemitsu Kosan Co., Ltd.] were added thereto, and finally 170.0 parts by weight of FEF carbon black [trade name: Asahi #60G, manufactured by Asahi Carbon Co., Ltd.] and 15.0 parts by weight of heavy calcium carbonate [trade name: Whitone SB manufactured by Shiraishi Calcium Kaisha, Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 0.8 part of a vulcanizing agent sulfur, 1.0 part of 2-(4'-morpholinodithio)benzothiazole (MDB) [trade name: Nocseller MDM manufactured by Ouchishinko Chemical Industrial Co., Ltd.], 0.4 part by weight of tetrabutyl thiuram disulfide (TBTD) [trade name: Sunseller TBTD manufactured by Sanshin Chemical Industry Co., Ltd.], 0.4 part by weight of zinc dibutyldithiocarbamate (ZnBDC) [trade name: Sunseller ZnBDC manufactured by Sanshin Chemical Industry Co., Ltd.] and 0.4 part by weight of 2-mercapto-2-imidazoline (EU) [trade name: Sunseller EU manufactured by Sanshin Chemical Industry Co., Ltd.] as vulcanizing accelerators, and 5.0 parts by weight of a hygroscopic agent [trade name: Besta #BS manufactured by Inoue Sekkai Kogyo Co., Ltd.] were added thereto and dispersed and kneaded for 6 minutes, and the kneaded product was gaged into a ribbon of 10 mm in thickness and 70 mm in width to give a non-vulcanized rubber composition.

As shown in FIG. 2, the rubber composition thus obtained was introduced into a ϕ60 mm rubber extruder 2, and then the extruded non-vulcanized rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), to give a tubular vulcanized rubber product (hose) having an outer diameter of 15 mm and an inner diameter of 13 mm.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

The treatment liquid (1) 6 was sprayed by the spraying device 4 onto the surface of the non-vulcanized rubber composition 3 until the non-vulcanized rubber composition 3 reached the UHF vulcanizing bath 7. In the spray method, a compressor was combined with a pressure-sending tank, and a spraying gun (HM-3: nozzle diameter 1.0 mm) 5 manufactured by Fuso Seiki Co., Ltd. was used.

According to the methods described above, the vulcanized rubber product thus obtained was measured for the surface roughness of the product, compression set (CS), specific gravity, and the amount of sulfur present in the surface and the inside of the product.

The results are shown in Table 5.

Comparative Example 7

A tubular vulcanized rubber product (hose) having an outer diameter of 15 mm and an inner diameter of 13 mm was prepared in the same manner as in Example 9 except that the surface treatment with the treatment liquid (1) was not conducted.

According to the methods described above, the vulcanized rubber product thus obtained was measured for the surface roughness of the product, compression set (CS), specific gravity, and the amount of sulfur present in the surface and the inside of the product.

The results are shown in Table 5.

Comparative Example 8

A tubular vulcanized rubber product (hose) having an outer diameter of 15 mm and an inner diameter of 13 mm was obtained in the same manner as in Example 9 except that in preparing the non-vulcanized rubber composition, the amount of sulfur blended was 0.96 part by weight, the amounts of vulcanizing accelerators MDB, TBTD, ZnBDC and EU blended were 1.2 parts by weight, 0.48 part by weight, 0.48 part by weight and 0.48 parts by weight respectively, and also that the surface treatment with the treatment liquid (1) was not conducted.

According to the methods described above, the vulcanized rubber product thus obtained was measured for the surface roughness of the product, the surface roughness of the internal surface of the hollow, compression set (CS), specific gravity, and the amount of sulfur present in the surface and the inside of the product.

The results are shown in Table 5.

TABLE 5

|  | Example 9 | Comparative Example 7 | Comparative Example 8 |
|---|---|---|---|
| Treatment liquid | (1) | Not treated | Not treated |
| Method of applying the treatment liquid | Spray system | | |
| Surface roughness (μm) | | | |
| Surface of the product | 3 | 8 | 6 |
| Internal surface of the hollow in the product | 6 | 6 | 6 |
| Mechanical strength properties | | | |
| TB (MPa) | 13.5 | 12.1 | 11.5 |
| EB (%) | 350 | 320 | 280 |
| Compression set (%) | 30 | 34 | 32 |
| Evaluation of abrasion resistance Evaluation | 3 | 2 | 2 |
| Specific gravity | 1.24 | 1.24 | 1.24 |
| Amount of present sulfur (atom-%) | | | |
| Surface of the product | 0.6 | 0.2 | 0.2 |
| Inside of the product | 0.2 | 0.2 | 0.2 |
| Ratio of present sulfur | 3.0 | 1.0 | 1.0 |

From Table 5, the following can be understood.

The glass run channel product in Example 9 is a solid extruded molded product, and is thus superior in surface smoothness to a sponge product. In Example 9, the surface treatment method of the present invention is used thereby improving surface smoothness, mechanical strength and elongation (mechanical strength properties). This is understood by comparison with Comparative Example 8.

Generally, as the degree of crosslinkage is increased (as the amount of the vulcanizing agent is increased), abrasion resistance is improved. In Comparative Example 8, therefore, the vulcanizing agent and the vulcanizing accelerators were blended respectively in amounts which were 1.2-times as high as those in Example 9 to achieve similar abrasion resistance, but the resulting glass run channel product was poor in mechanical strength and elongation. Accordingly, it can be understood that surface smoothness, mechanical strength properties and abrasion resistance cannot be simultaneously improved by compounding the vulcanizing agent etc.

Example 10

Preparation of Rubber Composition and Vulcanized Rubber Product

First, 15.0 parts by weight of ethylene/propylene/non-conjugated polyene copolymer rubber (EPT-D) and 93.0 parts by weight of ethylene/propylene/non-conjugated polyene copolymer rubber (EPT-B) were masticated for 30 seconds, and then 3.0 parts by weight of active zinc white [trade name: METAZ-102 manufactured by Inoue Sekkai Kogyo], 1.0 part by weight of stearic acid and 113.0 parts by weight of paraffin oil [trade name: Dianaprocess PA-90 manufactured by Idemitsu Kosan Co., Ltd.] were added thereto, and finally 170.0 parts by weight of FEF carbon black [trade name: Asahi #60G, manufactured by Asahi Carbon Co., Ltd.] were added thereto and kneaded for 4 minutes, and the resulting compound was discharged. The temperature of the compound after discharge was 150 to 170° C. The kneading was carried out in a Banbury mixer having a volume of 16 L (manufactured by Kobe Steel, Ltd.) in a charging degree of 70%.

Then, this compound was wound on 14-inch open rolls (the surface temperature of a former roll, 50° C.; the surface temperature of a latter roll, 50° C.; number of revolutions of the former roll, 16 rpm; the number of revolutions of the latter roll, 18 rpm), and 1.5 parts by weight of Sunfel R [trade name, manufactured by Mitsui Chemicals, Inc.] and 0.4 part by weight of sulfur as vulcanizing agents, 0.7 part of N-cyclohexyl-2-benzothiazolyl sulfenamide (CBS) [trade name: Sunseller CBS manufactured by Sanshin Kagaku Kogyo], 1.5 parts by weight of zinc dibutyldithiocarbamate (ZnBDC) [trade name: Sunseller ZnBDC manufactured by Sanshin Chemical Industry Co., Ltd.], 0.5 part by weight of tetramethyl thiuram disulfide (TMTD) [trade name: Sunseller TT manufactured by Sanshin Chemical Industry Co., Ltd.], 0.5 part by weight of dipentamethylene thiuram tetrasulfide (DPTT) [trade name: Sunseller DPTT manufactured by Sanshin Chemical Industry Co., Ltd.] and 0.25 part by weight of tellurium diethyl dithiocarbamate (TeEDC) [trade name: Sunseller TTTE manufactured by Sanshin Chemical Industry Co., Ltd.] as vulcanizing accelerators were added thereto and dispersed and kneaded for 6 minutes, and the kneaded product was gaged into a ribbon of 10 mm in thickness and 70 mm in width to give a non-vulcanized rubber composition.

As shown in FIG. 2, the non-vulcanized rubber composition thus obtained was introduced into a φ60 mm rubber extruder 2, and then the extruded non-vulcanized rubber composition 3 was passed through a spraying device 4 and passed continuously through a molding line wherein a vulcanizing bath 7 (180° C., 4 kW) and a heated air vulcanizing bath (HAV) 8 (240° C., 5 minutes) were connected in series in an ultra-high frequency vulcanizing device (UHF), to give a tubular vulcanized rubber product (hose product) having an outer diameter of 10 mm and an inner diameter of 8 mm.

The rate of the conveyor belt was regulated such that the extruder 2 was at a rate of 2.5 m/min., the UHF 7 outlet was 2.7 m/min., the HAV 8 outlet was 2.9 m/min., and a take-off unit (not shown) was 3.2 m/min.

The treatment liquid (1) 6 was sprayed by the spraying device 4 onto the surface of the non-vulcanized rubber composition 3 until the non-vulcanized rubber composition 3 reached the UHF vulcanizing bath 7. In the spraying method, a compressor was combined with a pressure-sending tank, and a spraying gun (HM-3: nozzle diameter 1.0 mm) 5 manufactured by Fuso Seiki Co., Ltd. was used.

According to the methods described above, the vulcanized rubber product thus obtained was measured for the surface roughness of the product, the surface roughness of the internal surface of the hollow, compression set (CS), specific gravity and the amount of sulfur present in the surface and the inside of the product.

The results are shown in Table 6.

Comparative Example 9

A tubular vulcanized rubber product (hose product) having an outer diameter of 10 mm and an inner diameter of 8 mm was prepared in the same manner as in Example 10 except that the surface treatment with the treatment liquid (1) was not conducted.

According to the methods described above, the vulcanized rubber product thus obtained was measured for the surface roughness of the product, the surface roughness of the internal surface of the hollow, compression set (CS), specific gravity and the amount of sulfur present in the surface and the inside of the product.

The results are shown in Table 6.

TABLE 6

|  | Example 10 | Comparative Example 9 |
| --- | --- | --- |
| Treatment liquid | (1) | Not treated |
| Method of applying the treatment liquid | Spray system | |
| Surface roughness (μm) | | |
| Surface of the product | 3 | 9 |
| Internal surface of the hollow in the product | 9 | 9 |
| Mechanical strength properties | | |
| TB (MPa) | 13.4 | 11.9 |
| EB (%) | 320 | 270 |
| Compression set (%) | 36 | 42 |
| Evaluation of abrasion resistance Evaluation | 3 | 2 |
| Specific gravity | 1.21 | 1.21 |
| Amount of present sulfur (atom-%) | | |
| Surface of the product | 0.5 | 0.2 |
| Inside of the product | 0.2 | 0.2 |
| Ratio of present sulfur | 2.5 | 1.0 |

The hose product obtained in Example 10 is produced by using the surface treatment method of the present invention, in preparation of the hose product, and the ratio of present sulfur is 2.5-times, the surface smoothness, mechanical strength and elongation of the product are improved, and the abrasion resistance is also improved.

Example 11

Figure 4:
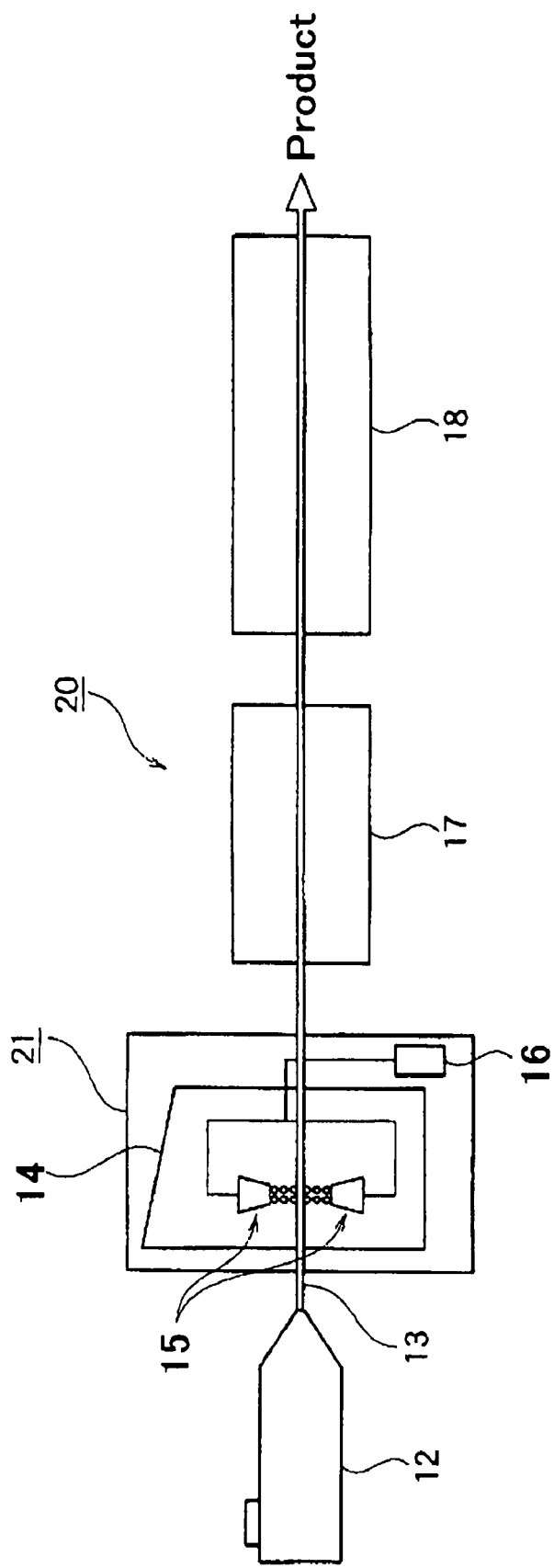
FIG. 4 is a schematic view showing another continuous vulcanizing molding device equipped with one example of a spraying device.

As shown in FIG. 4, the rubber composition obtained in Example 1 was introduced into a φ60 mm rubber extruder 12, and then the shaped non-vulcanized non-foamed rubber composition 13 was passed through a spraying device 21 described later and passed continuously through a molding line wherein a vulcanizing bath 17 (180° C., 4 kW) and a heated air vulcanizing bath (HAV) 18 (240° C., 5 minutes) were connected in series in an ultra-high frequency vulcanizing device (UHF), whereby the tubular non-vulcanized rubber having an inner diameter of 10 mm and an outer diameter of 11 mm (thickness 1 mm), extruded through a die of the rubber extruder, was vulcanized and foamed to give sponge rubber. The rate of the conveyor belt was regulated such that the extruder 12 was at a rate of 2.5 m/min., the UHF 17 outlet was 2.7 m/min., the HAV 18 outlet was 2.9 m/min., and a take-off unit (not shown) was 3.2 m/min.

A treatment liquid (4) prepared in a manner described later was sprayed by the spraying device 21 described later onto the surface of the shaped non-vulcanized non-foamed rubber composition 13 until the non-vulcanized non-foamed rubber composition 13 reached the UHF vulcanizing bath 17.

Preparation of Treatment Liquid (4)

A 500-ml four-necked flask equipped with a nitrogen inlet, a thermometer and a propeller stirrer was placed on a water bath, and nitrogen was introduced into the flask, and 262.5 g purified water and 6 g nonionic surfactant polyoxyethylene lauryl ether as a dispersant were introduced into the flask in a nitrogen atmosphere, and the mixture was stirred with the stirrer to dissolve a dispersant.

When the dispersant was dissolved, 30 g colloidal sulfur (capable of passing through a 300-mesh screen) and 1.5 g of 10 wt % aqueous solution of polyvinylalcohol (completely saponified, a polymerization degree of 1700) as a stabilizer were added to the flask.

While the temperature in the flask was kept at 30° C. or less, the mixture was stirred continuously for 5 hours, and the colloidal sulfur was dispersed sufficiently to give liquid (4).

Spraying Device 21

In FIG. 4, the spraying device 21 includes a spray booth 14 equipped with a plurality of nozzles 15 for spraying a spray liquid and a spray tank 16, and the spraying device 21 and spray booth 14 are formed with a hole through which the shaped non-vulcanized rubber composition 13 is passed.

The nozzle 15 is a siphon two-fluid nozzle through which a spray liquid is suctioned by an air stream from the spray tank 16, to spray fine droplets of the spray liquid.

A plurality of nozzles 15 for spraying a spray liquid are arranged such that the nozzles are apart from one another to achieve uniform spraying onto the whole surface of the shaped non-vulcanized rubber composition 13.

Specifically, a plurality of nozzles 15 are arranged such that they are apart from one another at a certain angle around the axis in the longer direction of the shaped non-vulcanized rubber composition 13, so as to permit the spray nozzles to be always directed towards the shaped non-vulcanized rubber 13. Depending on the shape of the shaped non-vulcanized rubber composition 13, the spray liquid can thereby be sprayed at various angles, and even if the shaped non-vulcanized rubber composition 13 has a complicated lip, the whole of the lip can be sprayed so that the whole surface of the shaped non-vulcanized rubber composition 13 can be uniformly sprayed.

Although the means of arranging nozzles 15 is not shown in the figure, a plurality of nozzles were arranged so as to be apart from one another at a predetermined angle around a hole arranged in the center of a disk-shaped nozzle bracket via a fixing device in the nozzle bracket, that is, around the axis in the longer direction of the shaped non-vulcanized rubber composition passing through the hole. In this example, specifically, two nozzles are arranged so as to be apart from each other at an angle of 180°.

The spray diameter of the above nozzle 15 is usually in the range of 0.05 to 1 mm, preferably 0.1 to 0.5 mm, and the average particle diameter of spray particles form the nozzle 15 is usually in the range of 1 to 100 μm, preferably 10 to 50 μm. The spray liquid sprayed from the nozzle 15 can thereby be formed into fine spray, and the whole surface of the shaped non-crosslinked rubber composition 13 can be sprayed without deformation of the non-vulcanized rubber molded product.

The average particle diameter of spray particles from the nozzle can be measured by a laser diffraction particle size distribution measuring instrument (Master Sizer 2000 manufactured by Sysmex Corporation).

In this example, specifically, a siphon 2-fluid nozzle having a spray opening of 0.4 mm was used.

The spray liquid is placed in the spray tank 16, and the spray tank 16 is provided with a stirrer to prevent precipitation.

In the spraying device 21, a means of preventing droplets adhering by spraying to the wall surface from dripping on the shaped non-vulcanized rubber composition 13 is arranged in the spray booth 14. Specifically, the spraying device 21 is constituted such that the ceiling of the spray booth 14 is inclined so that the adhering spray liquid runs along the inclined ceiling of the spray both 14. When molding, spraying and vulcanizing treatment are carried out plural times as a series of treatments, droplets of the spray liquid adhering to the wall surface of the spray booth 14 runs along the inclined ceiling of the spray booth 14 and can be recovered in a drain (not shown), whereby droplets of the spray liquid adhering to the wall surface are collected and prevented from dipping on the shaped non-vulcanized rubber composition 13.

Although not shown in FIG. 4, a decompression device for decompressing the spray booth 14 to prevent leakage of droplets of the spray liquid sprayed from the spray booth 14 is arranged in the spray booth 14.

The air pressure of air stream in the nozzle was regulated at 0.26 Kgf/cm$^2$, and the surface of the shaped non-vulcanized rubber composition 13 was sprayed with the spray liquid.

According to the methods described above, the vulcanized rubber foamed product (weather strip sponge) obtained in the manner described above was measured for the surface roughness of the product, the surface roughness of the internal surface of the hollow, shape retention, tensile strength at break ($T_B$), elongation ($E_B$), compression set (CS), abrasion resistance, specific gravity, improvement of foaming efficiency, water absorptivity, and the amount of sulfur present in the surface and the inside of the product. The results are shown in Table 7.

TABLE 7

|  | Example 11 |
|---|---|
| Treatment liquid | (4) |
| Method of applying the treatment liquid | Spray system |
| Surface roughness (μm) | |
| Surface of the product | 5 |
| Internal surface of the hollow in the product | 22 |
| Shape retention (%) | 86 |
| Mechanical strength properties | |
| TB (MPa) | 3.9 |
| EB (%) | 300 |
| Compression set (%) | 13 |
| Evaluation of abrasion resistance Evaluation | 3 |
| Specific gravity | 0.41 |
| Improvement of foaming efficiency (%) | 15 |
| Water adsorptivity (%) | 0.5 |
| Amount of present sulfur (atom-%) | |
| Surface of the product | 0.7 |
| Inside of the product | 0.3 |
| Ratio of present sulfur | 2.3 |

What is claimed is:

1. A vulcanized rubber molded product obtained by a method comprising (i) shaping a non-vulcanized rubber composition containing an elemental sulfur and/or a sulfur compound as a crosslinking agent into a predetermined product shape, (ii) spraying a liquid containing an elemental sulfur to generate droplets or spray and allowing the droplets or spray to adhere to the surface of the non-vulcanized rubber composition, and (iii) vulcanizing or vulcanizing and foaming the composition, said liquid being a dispersion wherein the elemental sulfur is dispersed in water, wherein the amount of sulfur atoms present in the surface of the vulcanized rubber molded product is at least 1.2 times as high as the amount of sulfur atoms present in a cut face obtained by cutting the surface to a depth of 1.0 mm in the vertical direction, and wherein the vulcanized rubber molded product is a foamed product.

2. A vulcanized rubber molded product obtained by a method comprising (i) shaping a non-vulcanized rubber composition containing an elemental sulfur and/or a sulfur compound as a crosslinking agent into a predetermined product shape, (ii) spraying a liquid containing an elemental sulfur to generate droplets or spray and allowing the droplets or spray to adhere to the surface of the non-vulcanized rubber composition, and (iii) vulcanizing or vulcanizing and foaming the composition, said liquid being a dispersion wherein the elemental sulfur is dispersed in water, wherein the amount of sulfur atoms present in the surface of the vulcanized rubber molded product is at least 1.2 times as high as the amount of sulfur atoms present in a cut face obtained by cutting the surface to a depth of 1.0 mm in the vertical direction, wherein the vulcanized rubber molded product has a hollow part at least partially, and meets the following relationship:

$$A/B < 1.0$$

wherein A is the surface roughness (RzD) of the vulcanized rubber molded product, and B is the roughness (RzD) of the internal surface of the hollow.

3. A method of producing the vulcanized rubber molded product according to claim 1, which comprises (i) shaping a non-vulcanized rubber composition containing an elemental sulfur and/or a sulfur compound as a crosslinking agent into a predetermined product shape, (ii) spraying a liquid containing an elemental sulfur to generate droplets or spray and allowing the droplets or spray to adhere to the surface of the non-vulcanized rubber composition, and (iii) vulcanizing or vulcanizing and foaming the composition, said liquid being a dispersion wherein the elemental sulfur is dispersed in water.

4. The method of producing a vulcanized rubber molded product according to claim 3, wherein the rubber contained in the non-vulcanized rubber composition is ethylene/α-olefin/non-conjugated polyene copolymer rubber.

5. The method of producing a vulcanized rubber molded product according to claim 3, wherein the non-vulcanized rubber composition comprises a foaming agent.

6. An automobile weather strip comprising the vulcanized rubber molded product of claim 1.

7. An automobile weather strip comprising the vulcanized rubber molded product of claim 2.

8. An automobile glass run channel comprising the vulcanized rubber molded product of claim 1.

9. An automobile glass run channel comprising the vulcanized rubber molded product of claim 2.

10. An automobile opening trim comprising the vulcanized rubber molded product of claim 1.

11. An automobile opening trim comprising the vulcanized rubber molded product of claim 2.

12. An automobile hose comprising the vulcanized rubber molded product of claim 1.

13. An automobile hose comprising the vulcanized rubber molded product of claim 2.

* * * * *